United States Patent
Park et al.

(10) Patent No.: US 12,067,201 B2
(45) Date of Patent: *Aug. 20, 2024

(54) TOUCH SENSOR CONTROLLER, OPERATING METHOD OF TOUCH SENSOR CONTROLLER, AND TOUCH SCREEN DRIVING CIRCUIT

(71) Applicant: SAMSUNG ELECTRONICS CO., LTD., Suwon-si (KR)

(72) Inventors: Junchul Park, Daegu (KR); Jonghee Na, Hwaseong-si (KR); Gwangho Nam, Hwaseong-si (KR); Taekon Yu, Hwaseong-si (KR); Hyunwook Lim, Seoul (KR); Woohyuk Jang, Hwaseong-si (KR); Bumsoo Kim, Hwaseong-si (KR); Byunghwee Park, Hwaseong-si (KR); Wongab Jung, Hwaseong-si (KR); Yoon-Kyung Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,402

(22) Filed: May 22, 2023

(65) Prior Publication Data

US 2023/0289018 A1 Sep. 14, 2023

Related U.S. Application Data

(63) Continuation of application No. 17/590,008, filed on Feb. 1, 2022, now Pat. No. 11,656,729.

(30) Foreign Application Priority Data

Feb. 4, 2021 (KR) .................. 10-2021-0016284

(51) Int. Cl.
*G06F 3/044* (2006.01)
*G06F 3/041* (2006.01)
*G09G 3/3233* (2016.01)

(52) U.S. Cl.
CPC .......... *G06F 3/0445* (2019.05); *G06F 3/0412* (2013.01); *G06F 3/04164* (2019.05);
(Continued)

(58) Field of Classification Search
CPC ........ G06F 3/044–0448; G06F 3/0416–04186; G06F 3/0412; G09G 3/32–3291;
(Continued)

(56) References Cited

U.S. PATENT DOCUMENTS 8,552,998 B2 * 10/2013 Hotelling ............ G06F 3/04166
345/173
8,928,617 B2 * 1/2015 Hotelling .............. G06F 3/0446
345/173

(Continued)

FOREIGN PATENT DOCUMENTS

JP 5354545 B2 11/2013
KR 10-1631376 B1 6/2016

OTHER PUBLICATIONS

Kim, Jin-Sung, et al., "Effect of Load Distribution on the Voltage Drop and the Luminance Variation in an AC-PDP", IEEE Electron Device Letters, vol. 28, No. 10 : 896-898 (Oct. 2007).

(Continued)

*Primary Examiner* — Patrick F Marinelli
(74) *Attorney, Agent, or Firm* — Muir Patent Law, PLLC

(57) ABSTRACT

A touch sensor controller for driving a touch sensor that is stacked on a display panel and includes driving electrodes and receiving electrodes crossing the driving electrodes, the touch sensor controller including: a driving circuit configured to sequentially provide driving signals to the driving (Continued)

electrodes; a read-out circuit configured to, in response to the driving signals, generate touch data based on first sensing signals received from the receiving electrodes and generate display noise data based on a second sensing signal received from a first driving electrode to which a driving signal of the driving signals is not applied from among the driving electrodes; and a touch processor configured to determine whether a touch input has occurred on the touch sensor based on the touch data and the display noise data.

18 Claims, 23 Drawing Sheets

(52) U.S. Cl.
CPC ........ *G06F 3/04166* (2019.05); *G06F 3/0418* (2013.01); *G06F 3/0446* (2019.05); *G09G 3/3233* (2013.01); *G09G 2320/0223* (2013.01); *G09G 2320/0295* (2013.01); *G09G 2354/00* (2013.01)

(58) Field of Classification Search
CPC ..... G09G 2320/029; G09G 2320/0295; G09G 2330/021; G09G 2354/00
See application file for complete search history.

(56) References Cited

U.S. PATENT DOCUMENTS

| | | | | |
|---|---|---|---|---|
| 8,947,373 | B2* | 2/2015 | Kremin | G06F 3/0445 |
| | | | | 345/173 |
| 9,229,577 | B2* | 1/2016 | Kremin | G06F 3/04182 |
| 9,285,902 | B1* | 3/2016 | Kremin | G06F 3/041 |
| 9,285,937 | B2 | 3/2016 | Kida et al. | |
| 9,442,611 | B2* | 9/2016 | Noguchi | G06F 3/04182 |
| 9,552,115 | B2* | 1/2017 | Hotelling | G06F 3/04166 |
| 9,569,035 | B1* | 2/2017 | Lee | G06F 3/04182 |
| 9,710,118 | B2 | 7/2017 | Park et al. | |
| 10,120,509 | B2* | 11/2018 | Chandran | G06F 3/0443 |
| 10,216,327 | B2 | 2/2019 | Yang | |
| 10,528,200 | B2* | 1/2020 | Park | G06F 3/0443 |
| 10,754,471 | B2* | 8/2020 | Lee | G06F 3/04166 |
| 10,871,850 | B2* | 12/2020 | Hotelling | G06F 3/044 |
| 11,061,508 | B2* | 7/2021 | Kim | G06F 3/0418 |
| 11,106,317 | B1* | 8/2021 | Liu | G06F 3/044 |
| 11,204,667 | B1* | 12/2021 | Jordan | G06F 3/04182 |
| 11,218,157 | B2* | 1/2022 | Choi | G06F 3/04182 |
| 11,269,457 | B1* | 3/2022 | Hollands | G06F 3/0445 |
| 11,392,244 | B2* | 7/2022 | Mohamed | G06F 3/0418 |
| 11,675,454 | B2* | 6/2023 | Hotelling | G06F 3/047 |
| | | | | 345/174 |
| 11,809,677 | B2* | 11/2023 | Tran | G06F 1/163 |
| 11,842,014 | B2* | 12/2023 | Holmgren | G06F 3/0304 |
| 2008/0158167 | A1* | 7/2008 | Hotelling | G06F 1/3265 |
| | | | | 345/173 |
| 2010/0328265 | A1* | 12/2010 | Hotelling | G06F 3/041661 |
| | | | | 345/173 |
| 2011/0115729 | A1* | 5/2011 | Kremin | G06F 3/0446 |
| | | | | 345/173 |
| 2011/0227864 | A1* | 9/2011 | Baek | G06F 3/0418 |
| | | | | 345/174 |
| 2012/0056834 | A1* | 3/2012 | Kim | G06F 3/04184 |
| | | | | 345/173 |
| 2013/0082954 | A1* | 4/2013 | Azumi | G06F 3/041 |
| | | | | 345/545 |
| 2014/0035653 | A1* | 2/2014 | Jeong | G06F 3/0418 |
| | | | | 327/337 |
| 2014/0168143 | A1* | 6/2014 | Hotelling | G06F 3/0446 |
| | | | | 345/174 |
| 2014/0168151 | A1* | 6/2014 | Noguchi | G06F 3/0418 |
| | | | | 345/87 |
| 2014/0375612 | A1* | 12/2014 | Hotelling | G06F 3/047 |
| | | | | 345/174 |
| 2015/0137826 | A1* | 5/2015 | Im | G06F 3/0418 |
| | | | | 324/537 |
| 2015/0145819 | A1* | 5/2015 | Bae | G02F 1/13338 |
| | | | | 345/174 |
| 2015/0205438 | A1* | 7/2015 | Kremin | G06F 3/04182 |
| | | | | 345/174 |
| 2016/0124544 | A1* | 5/2016 | Kang | G06F 3/03547 |
| | | | | 345/174 |
| 2016/0148034 | A1* | 5/2016 | Kremin | G06V 40/1306 |
| | | | | 382/124 |
| 2016/0342265 | A1* | 11/2016 | Geaghan | G06F 3/0446 |
| 2017/0090668 | A1* | 3/2017 | Agarwal | G06F 3/044 |
| 2017/0097728 | A1* | 4/2017 | Hotelling | G06F 3/0445 |
| 2017/0115824 | A1* | 4/2017 | Katsurahira | G06F 3/0442 |
| 2017/0185182 | A1* | 6/2017 | Chandran | G06F 3/04184 |
| 2018/0046325 | A1 | 2/2018 | Kim et al. | |
| 2018/0188888 | A1* | 7/2018 | Hosur | G06F 3/04182 |
| 2018/0253167 | A1* | 9/2018 | Park | G06F 3/04883 |
| 2019/0235663 | A1* | 8/2019 | Xuan | G06F 3/04184 |
| 2019/0294310 | A1* | 9/2019 | Lee | G06F 3/04184 |
| 2019/0384445 | A1* | 12/2019 | Huang | G06F 3/0443 |
| 2020/0036386 | A1* | 1/2020 | Choi | H10K 59/353 |
| 2021/0004120 | A1* | 1/2021 | Kim | G06F 3/044 |
| 2021/0109640 | A1* | 4/2021 | Hotelling | G06F 3/0416 |
| 2022/0043523 | A1* | 2/2022 | Kim | G06F 3/044 |
| 2022/0057890 | A1* | 2/2022 | Mohamed | G06F 3/04182 |
| 2022/0155937 | A1* | 5/2022 | Jo | G06F 3/04184 |
| 2022/0197472 | A1* | 6/2022 | Kim | G06F 3/04182 |
| 2022/0229517 | A1* | 7/2022 | Kim | G06F 3/0418 |
| 2022/0244812 | A1* | 8/2022 | Park | G06F 3/0418 |
| 2022/0261104 | A1* | 8/2022 | Liu | G06F 3/0416 |
| 2023/0083400 | A1* | 3/2023 | Huang | G06F 1/3262 |
| | | | | 345/173 |
| 2023/0093204 | A1* | 3/2023 | Latif | G06F 11/3438 |
| | | | | 345/173 |
| 2023/0289018 | A1* | 9/2023 | Park | G06F 3/04164 |

OTHER PUBLICATIONS

Kim, Hyun-Sik, et al., "Switching power supply circuit with voltage-drop compensation for AMOLED displays", IEICE Electronics Express, vol. 13, No. 12, pp. 1-6, (2016).

* cited by examiner

TOUCH SENSOR CONTROLLER, OPERATING METHOD OF TOUCH SENSOR CONTROLLER, AND TOUCH SCREEN DRIVING CIRCUIT

CROSS-REFERENCE TO RELATED APPLICATIONS

This is a continuation application based on pending application Ser. No. 17/590,008, filed Feb. 1, 2022, the entire contents of which is hereby incorporated by reference.

This application is based on and claims priority under 35 U.S.C. § 119 to Korean Patent Application No. 10-2021-0016284, filed on Feb. 4, 2021, in the Korean Intellectual Property Office, the disclosure of which is incorporated by reference herein in its entirety.

BACKGROUND

1. Field

Embodiments relate to a touch sensor controller, an operating method of a touch sensor controller, and a touch screen driving circuit.

2. Description of the Related Art

A touch screen may include a display panel for displaying images and a touch sensor for sensing a touch, wherein the display panel and the touch sensor may be vertically stacked or may be integrally formed to share at least one layer.

SUMMARY

Embodiments are directed to a touch sensor controller for driving a touch sensor that is stacked on a display panel and includes driving electrodes and receiving electrodes crossing the driving electrodes, the touch sensor controller including: a driving circuit configured to sequentially provide driving signals to the driving electrodes; a read-out circuit configured to, in response to the driving signals, generate touch data based on first sensing signals received from the receiving electrodes and generate display noise data based on a second sensing signal received from a first driving electrode to which a driving signal of the driving signals is not applied from among the driving electrodes; and a touch processor configured to determine whether a touch input has occurred on the touch sensor based on the touch data and the display noise data.

Embodiments are also directed to an operating method of a touch sensor controller for driving a touch sensor that is stacked on a display panel and includes driving electrodes and receiving electrodes crossing the driving electrodes, the operating method including: applying a driving signal to at least one driving electrode from among the driving electrodes; performing, by first receivers provided in the touch sensor controller, touch sensing; and performing, by at least one second receiver provided in the touch sensor controller, display noise sensing simultaneously as the touch sensing is performed.

Embodiments are also directed to an operating method of a touch sensor controller for driving a touch sensor stacked on a display panel, the operating method including: generating, by the touch sensor controller, display noise data by performing display noise sensing during a first period of a display period in which an image is displayed on the display panel; generating, by the touch sensor controller, touch data by performing touch sensing in a second period during the display period, the second period being different from the first period; and processing, by the touch sensor controller, the touch data based on the display noise data.

Embodiments are also directed to a touch screen driving circuit for driving a touch screen panel including a display panel and a touch sensor stacked on the display panel, the touch screen driving circuit including: a display driving circuit configured to calculate a change amount of a power voltage at locations of the display panel based on received image data, and generate compensation information based on the change amount of the power voltage; and a touch sensor controller configured to receive the compensation information from the display driving circuit, and compensate for touch data generated based on touch sensing values received from the touch sensor based on the compensation information.

BRIEF DESCRIPTION OF THE DRAWINGS

Features will become apparent to those of skill in the art by describing in detail example embodiments with reference to the attached drawings in which.

DETAILED DESCRIPTION

Figure 1:
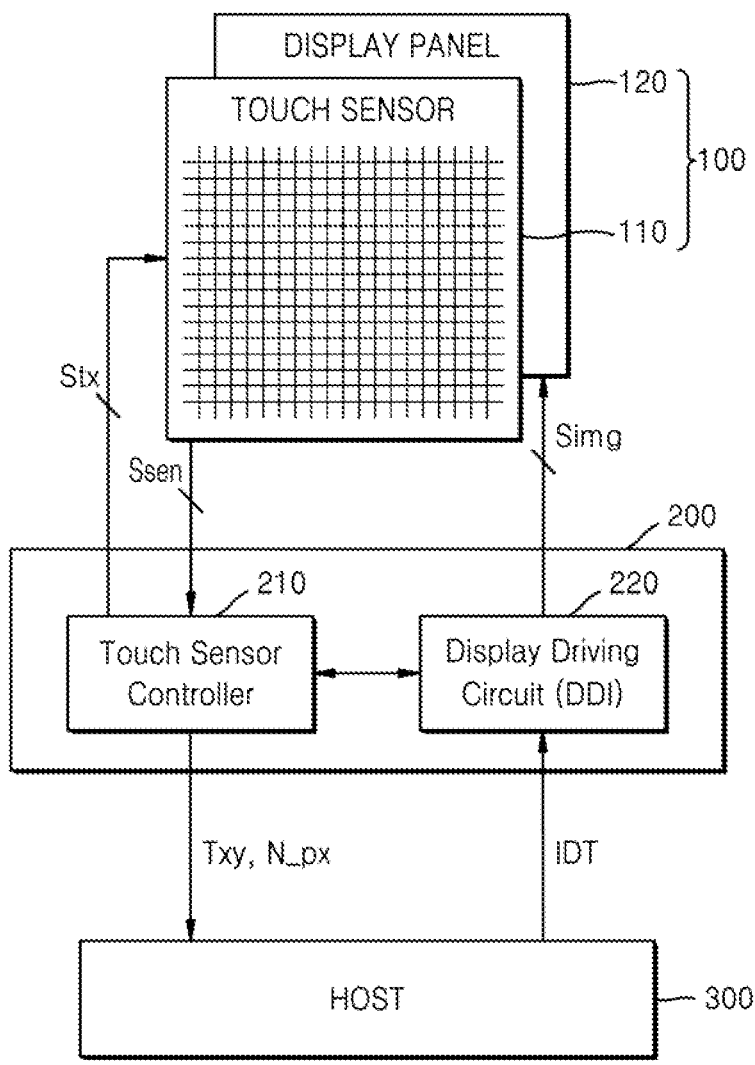
FIG. 1 is a block diagram showing a touch screen device according to an example embodiment.

FIG. 1 is a block diagram showing a touch screen device according to an example embodiment.

Referring to FIG. 1, a touch screen device 1000 may be mounted on various electronic devices. For example, the touch screen device 1000 may be mounted on an electronic device like a tablet personal computer (PC), an e-reader, a personal digital assistant (PDA), a portable multimedia player (PMP), a mobile terminal, a smartphone, a wearable device, an Internet of Things (IoT) device, a refrigerator, a navigation device, etc. Also, the touch screen device 1000 may be mounted on an electronic device provided as a component for vehicles, furniture, manufacturing facilities, doors, and various measuring devices.

Referring to FIG. 1, the touch screen device 1000 may include a touch screen 100 and a touch screen driving circuit 200 for driving the touch screen 100. The touch screen 100 may include a touch sensor 110 and a display panel 120 to respectively provide a touch sensing function and a display function. The touch screen driving circuit 200 may include a touch sensor controller (TSC) 210 and a display driving circuit (DDI) 220. The TSC 210 and the DDI 220 may be integrated on one semiconductor chip or may be separately implemented on a plurality of semiconductor chips. In another implementation, the TSC 210 and the DDI 220 may be implemented as one semiconductor module.

Although FIG. 1 shows that the touch screen device 1000 includes a host 300, the host 300 may be implemented separately from the touch screen device 1000.

The touch screen 100 may display an image and may receive a touch input of a user.

The touch screen 100 may operate as an input/output device of an electronic device, and may operate as a proximity sensor that senses an approach of a conductive object. In an example embodiment, the touch screen 100 may further include a fingerprint sensor, and the touch screen device 1000 may perform a fingerprint recognition function.

The touch sensor 110 may sense a touch (or a touch input) on the touch screen 100, may and output sensing signals. Here, the touch includes not only a direct contact of a conductive object on the touch screen 100, but also an approach of a conductive object to the touch screen 100. For example, the conductive object may include a user's body part (e.g., a finger, a palm, the face, an ear), a touch pen, a stylus pen, etc. The touch sensor 110 may be stacked on the display panel 120, and may be attached to a front surface of the display panel 120 (e.g., a surface from which light signals are emitted). In an example embodiment, the touch sensor 110 may cover the front surface of the display panel 120.

The touch sensor 110 may be implemented as a transparent panel having a touch-sensitive surface. In another implementation, the touch sensor 110 may be implemented as a touch sensor array in which transparent electrodes are patterned.

The touch sensor 110 may include a plurality of electrodes. Sensing signals according to one of various touch sensing methods may be output through the electrodes.

In one example, the electrodes may respectively output sensing signals according to a capacitance sensing method. For example, the touch sensor 110 may include a driving electrode to which a driving signal Stx is applied, and a receiving electrode from which a sensing signal Ssen is output. The driving electrode may extend in a first direction, and the receiving electrode may extend in a second direction perpendicular to the first direction. The driving electrode and the receiving electrode may be referred to as a driving channel and a receiving channel, respectively. The touch sensor 110 may include a plurality of driving electrodes arranged side by side and a plurality of receiving electrodes arranged side by side. The driving electrode and the receiving electrode may cross each other, and a mutual capacitance may be formed between the driving electrode and the receiving electrode crossing each other. Each point at which mutual capacitance is formed may be referred to as a sensing node of the touch sensor 110.

In another example, the touch sensor 110 may include a plurality of sensing electrodes arranged in rows and columns, and a capacitance may be formed in each of the sensing electrodes. For example, a capacitance may be formed between each sensing electrode and the ground (or a conductive layer in the touch screen 100), and the capacitance may be referred to as self-capacitance. A driving signal Stx may be applied to each of the sensing electrodes, and a sensing signal Ssen may be output from each of the sensing electrodes. Thus, each of the sensing electrodes may operate as a driving electrode and a receiving electrode, and each of the sensing electrodes may be referred to as a sensing node of the touch sensor 110. The driving signal Stx may be applied through a driving electrode, and the sensing signal Ssen representing a capacitance (e.g., mutual capacitance or self-capacitance) may be generated based on the driving signal Stx, and the sensing signal Ssen may be output through a receiving electrode. When a conductive object like a human finger or a stylus contacts or is located close to a sensing node of the touch sensor 110, the capacitance corresponding to the sensing node changes, and a sensing signal Ssen output from the touch sensor 110 may be changed according to the changed capacitance. For example, the level of the sensing signal Ssen may increase or decrease as compared to that before a touch occurs. Touch data may be generated based on levels of sensing signals Ssen output from the touch sensor 110.

The display panel 120 may include a plurality of gate lines, a plurality of source lines, and a plurality of pixels respectively arranged in rows and columns at points where the gate lines intersect with the source lines. The pixels may display an image based on image signals Simg received through the source lines and the gate lines. The image may be updated according to a set frame rate. The display panel 120 may be implemented as one of a liquid crystal display (LCD), a light-emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), a vacuum fluorescent display (VFD), and other types of flat panels or flexible panels.

Although FIG. 1 shows that the touch sensor 110 and the display panel 120 are separate components, the touch screen 100 may be implemented as an in-cell type panel (in which electrodes of the touch sensor 110 and pixels of the display panel 120 are combined with each other) or an on-cell type panel (in which electrodes of the touch sensor 110 are arranged on the display panel 120).

The TSC 210 may scan (e.g., drive and sense) the touch sensor 110. Thus, the TSC 210 may perform touch sensing.

The TSC 210 may provide a driving signal Stx to the driving electrodes of the touch sensor 110, and may receive sensing signals Ssen generated based on the driving signal Stx from the touch sensor 110.

The TSC 210 may convert the sensing signals Ssen, which are analog signals, into touch values, which are digital signals, and may generate touch data including touch values corresponding to the respective sensing nodes of the touch sensor 110.

The TSC 210 may determine that a touch input has occurred at at least one particular location on the touch screen 100 based on the touch data, and may calculate the location where the touch input has occurred, that is, a touch coordinate Txy. The TSC 210 may transmit the touch coordinate Txy to the host 300. In an example embodiment, the TSC 210 may calculate a touch pressure, and may provide the touch pressure to the host 300 together with the touch coordinate Txy.

The TSC 210 may also determine that a conductive object is close to the touch screen 100 based on the touch data. Thus, the TSC 210 may perform proximity sensing. For example, when it is determined that a low-level touch input has occurred in a relatively wide region of the touch screen 100 based on the touch data, the TSC 210 may determine that a conductive object is close to the touch screen 100. The TSC 210 may provide a proximity notification signal N_px, indicating that a conductive object is in the proximity, to the host 300.

In an example embodiment, the TSC 210 may perform touch sensing for the touch sensor 110 and noise sensing (e.g., display noise sensing) at the same time or at different times, and may process touch data generated through the touch sensing based on noise data (e.g., display noise data) generated through the noise sensing. For example, the TSC 210 may generate compensated touch data by removing noise data from touch data. For example, the TSC 210 may discard touch data when noise data exceeds a predetermined value. Discarded touch data may be frame data corresponding to one frame of the touch sensor 110.

In an example embodiment, the TSC 210 may perform noise sensing at the same time as the touch sensing for the touch sensor 110, and may remove a noise sensing signal from a touch sensing signal to generate touch data from which noise is removed.

In an example embodiment, the TSC 210 may receive, as compensation information, voltage changes at a plurality of points on the display panel 120 (which cause components of display noise to the touch sensor 110) or offset values (which are calculated based on the voltage changes) from the DDI 220, and may remove components of display noise from touch data or discard the touch data based on the compensation information.

As described above, because the TSC 210 removes a noise sensing signal from a touch sensing signal or processes touch data based on noise data, the reliability of touch data may be improved, and touch sensing sensitivity may be improved.

The method of sensing pieces of noise performed by the TSC 210, the method of generating voltage changes performed by the DDI 220, and the method of processing touch data based on voltage changes performed by the TSC 210 will each be described below in more detail with reference to FIGS. 2 to 20.

Still referring to FIG. 1, the DDI 220 may receive image data IDT from the host 300, and may drive the display panel 120 to display an image according to the image data IDT on the display panel 120. The DDI 220 may convert the image data IDT into image signals Simg, which are analog signals, and provide the image signals Simg to corresponding pixels of the display panel 120.

The host 300 may perform an overall control operation for the touch screen device 1000. The host 300 may generate data related to a display operation, and may provide the data to the DDI 220. The host 300 may receive touch information like a touch coordinate Txy or a proximity notification signal N_px from the TSC 210, and may perform control operations using the touch information. For example, when a proximity notification signal N_px is received while a display operation is being performed, the host 300 may stop a display operation by providing a control signal for stopping the display operation to the DDI 220.

In an example embodiment, the host 300 may include an application processor (AP). The AP may be implemented as a system-on-chip (SoC). The SoC may include a system bus (not shown) to which a predetermined standard bus protocol is applied, and may include various intellectual properties (IPs) connected to the system bus. As a standard protocol for the system bus, various types of protocols like the advanced microcontroller bus architecture (AMBA) protocol of Advanced RISC Machine (ARM) may be applied.

Figure 2:
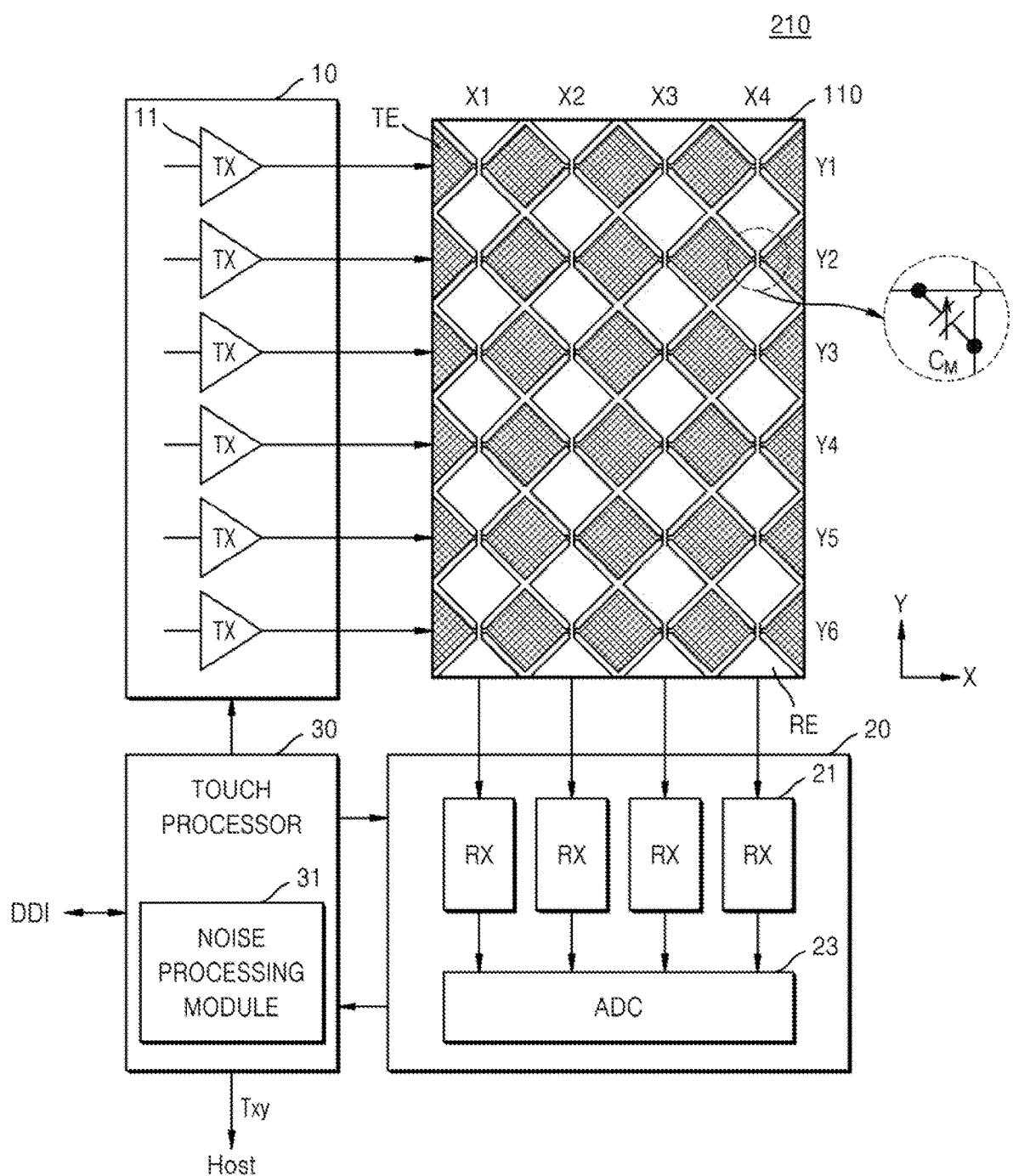
FIG. 2 is a diagram schematically showing a touch sensor controller according to an example embodiment.

FIG. 2 is a diagram schematically showing a TSC according to an example embodiment. For convenience of explanation, the touch sensor 110 will be shown together.

Referring to FIG. 2, the touch sensor 110 may include a plurality of driving electrodes TE, e.g., first to sixth driving electrodes Y1 to Y6. The touch sensor 110 may include a plurality of sensing electrodes RE, e.g., first to fourth receiving electrodes X1 to X4. The number of driving electrodes and the number of receiving electrodes included in the touch sensor 110 may be varied according to the resolution of the touch sensor 110.

The driving electrodes TE may extend in a first direction, e.g., an X-axis direction, and the receiving electrodes RE may extend in a second direction orthogonal to the first direction, e.g., a Y-axis direction. The driving electrodes TE and the receiving electrodes RE may cross each other. A mutual capacitance CM may be formed between a driving electrode TE and a receiving electrode RE crossing each other.

In an example embodiment, the driving electrodes TE and/or the receiving electrodes RE may include a plurality of unit electrodes connected to one another in the first direction or the second direction. The unit electrodes may each have a particular shape (e.g., a rhombus-like shape as shown in FIG. 2) or may be in a particular pattern.

The TSC 210 may include a driving circuit 10, a read-out circuit 20, and a touch processor 30 (or control logic).

The driving circuit 10 may include a plurality of transmitters (TX) 11. The plurality of TXs 11 may provide driving signals to the driving electrodes TE. Each of the plurality of TXs 11 may correspond to at least one driving electrode TE from among the driving electrodes TE, and the plurality of TXs 11 may provide a driving signal to the corresponding at least one driving electrode TE. A driving signal may be sequentially applied to the driving electrodes TE, or driving signals may be simultaneously applied to the driving electrodes TE.

In an example embodiment, driving signals modulated based on different codes may be simultaneously applied to two or more driving electrodes TE from among the driving electrodes TE, and this is referred to as multi-driving. For example, driving signals having opposite polarities may be simultaneously applied to a first driving electrode Y1 and a second driving electrode Y2, and then driving signals having opposite polarities may be simultaneously applied to a third driving electrode Y3 and a fourth driving electrode Y4.

The read-out circuit 20 may include a plurality of receivers (RX) 21 and an analog-digital converter (ADC) 23. The plurality of RXs 21 may receive a plurality of sensing signals from the receiving electrodes RE. Each of the plurality of RXs 21 may be connected to one corresponding receiving electrode RE and receive a sensing signal or may be time-divisionally connected to at least two receiving electrodes RE and receive at least two sensing signals.

A sensing signal may include a touch signal indicating the mutual capacitance CM between the driving electrode TE (to which a driving signal is applied) and the receiving electrode RE (by which the sensing signal is received). For example, when a touch occurs at one sensing node on the touch sensor 110, the mutual capacitance CM of the sensing node may decrease, and the level of the sensing signal may decrease or increase compared to that before the touch.

The sensing signal may include a noise signal, e.g., noise from the display or a display noise signal. For example, when touch sensing is performed during a display period in which an image is displayed on the display panel (120 in FIG. 1), the sensing signal may include display noise due to the displaying of the image. According to a driving scheme of the driving circuit 10, the sensing signal may include a touch signal and display noise, or may include display noise excluding a touch signal.

The RX 21 may process a sensing signal received from a corresponding receiving electrode RE. For example, the RX 21 may convert a sensing signal (e.g., current-voltage conversion) or amplify the sensing signal.

The ADC 23 may analog-to-digital convert output signals of the plurality of RXs 21 (i.e., processed sensing signals), and may generate touch data and/or noise data. A plurality of touch values corresponding to a plurality of sensing nodes of the touch sensor 110 may be generated, and the touch values may be included in touch data of one frame.

The touch processor 30 may control the overall operation of the TSC 210 and, e.g., may control operation timings of the driving circuit 10 and the read-out circuit 20. The touch processor 30 may determine whether a touch has occurred and a location of the touch based on touch data and/or noise data output from the ADC 23, or may determine that a conductive object is in the proximity of the touch sensor 210.

The touch processor 30 may include a noise processing module 31. The noise processing module 31 may compensate for touch data based on noise data, or may determine whether to discard touch data based on noise data. For example, the noise processing module 31 may generate compensated touch data by subtracting noise data from touch data. For example, when the noise data is equal to or greater than a predetermined value, the noise processing module 31 may discard touch data without using the touch data to determine whether a touch has occurred, whether a conductive object is in the proximity, and/or a location of a corresponding touch.

Figure 3:
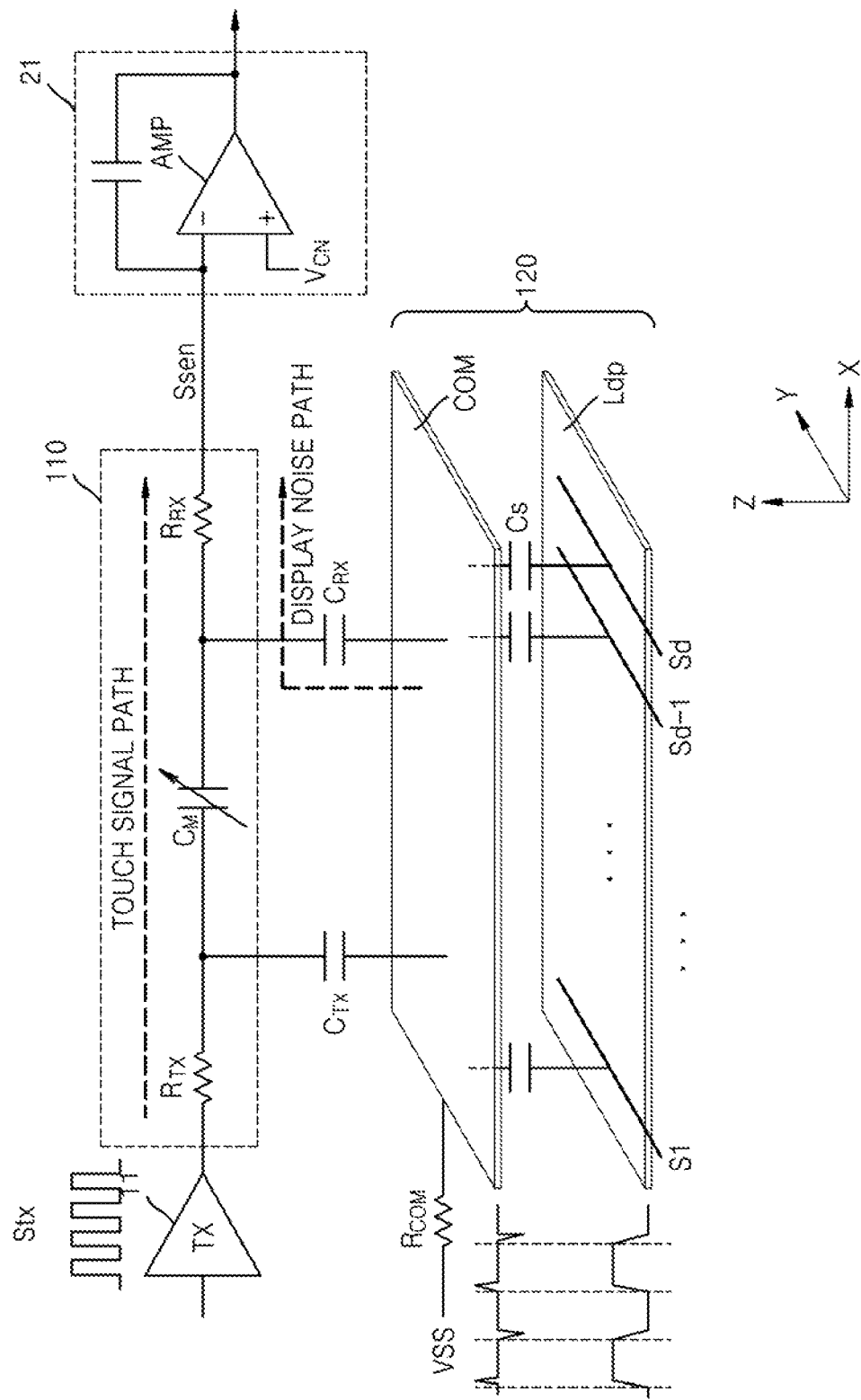
FIG. 3 is a diagram for describing components of display noise introduced into a touch sensor stacked on a display panel.

FIG. 3 is a diagram for describing components of display noise introduced into a touch sensor stacked on a display panel.

In FIG. 3, the display panel 120 may include a display layer Ldp and a common electrode COM. The display layer Ldp may be formed on a substrate of the display panel 120. The common electrode COM may be formed on the display layer Ldp.

The display layer Ldp may include a plurality of source lines S1 to Sd (d is a positive integer). The plurality of source lines S1 to Sd may be arranged in a first direction, e.g., the X-axis direction, and extend in a second direction, e.g., the Y-axis direction. Although not shown, the display layer Ldp may include a plurality of gate lines, and the plurality of gate lines may be arranged in the second direction and extend in the first direction. A plurality of pixels may be formed at points where the source lines S1 to Sd and the gate lines cross each other.

Parasitic capacitance Cs may be formed between the source lines S1 to Sd and the common electrode COM. When an image signal is applied to the source lines S1 to Sd, the voltage of the common electrode COM may be changed due to the parasitic capacitance Cs. A constant voltage, e.g., a ground voltage VSS, may be applied to the common electrode COM. However, due to an RC delay caused by a parasitic resistance Rcom of the common electrode COM, when an image signal is applied to the source lines S1 to Sd, the voltage of the common electrode COM may be changed.

A touch signal generated by the driving signal Stx provided from the TX 11 may be provided to the RX 21 as a sensing signal Ssen through a touch signal path. Meanwhile, parasitic capacitance $C_{TX}$ or $C_{RX}$ may be formed between the common electrode COM and the touch sensor 110. Display noise generated as the voltage of the common electrode COM is changed may be introduced into the sensing signal Ssen through a display noise path formed by the parasitic capacitance $C_{RX}$.

In general, the parasitic capacitance $C_{RX}$ increases as a gap between the touch sensor 110 and the common electrode COM is narrowed, e.g., as in an ultra-thin touch screen panel (e.g., 100 in FIG. 1). Due to the increase in the parasitic capacitance $C_{RX}$, the introduction of display noise to the sensing signal Ssen may increase, which may make it difficult to distinguish a touch signal from display noise, and difficult to determine whether a change in the sensing signal Ssen is caused by a touch input or display noise. According to the present example embodiment, the TSC (210 of FIG. 1) separately senses display noise introduced into the touch sensor 110 to generate display noise data, and may process touch data based on the display noise data.

Figure 4:
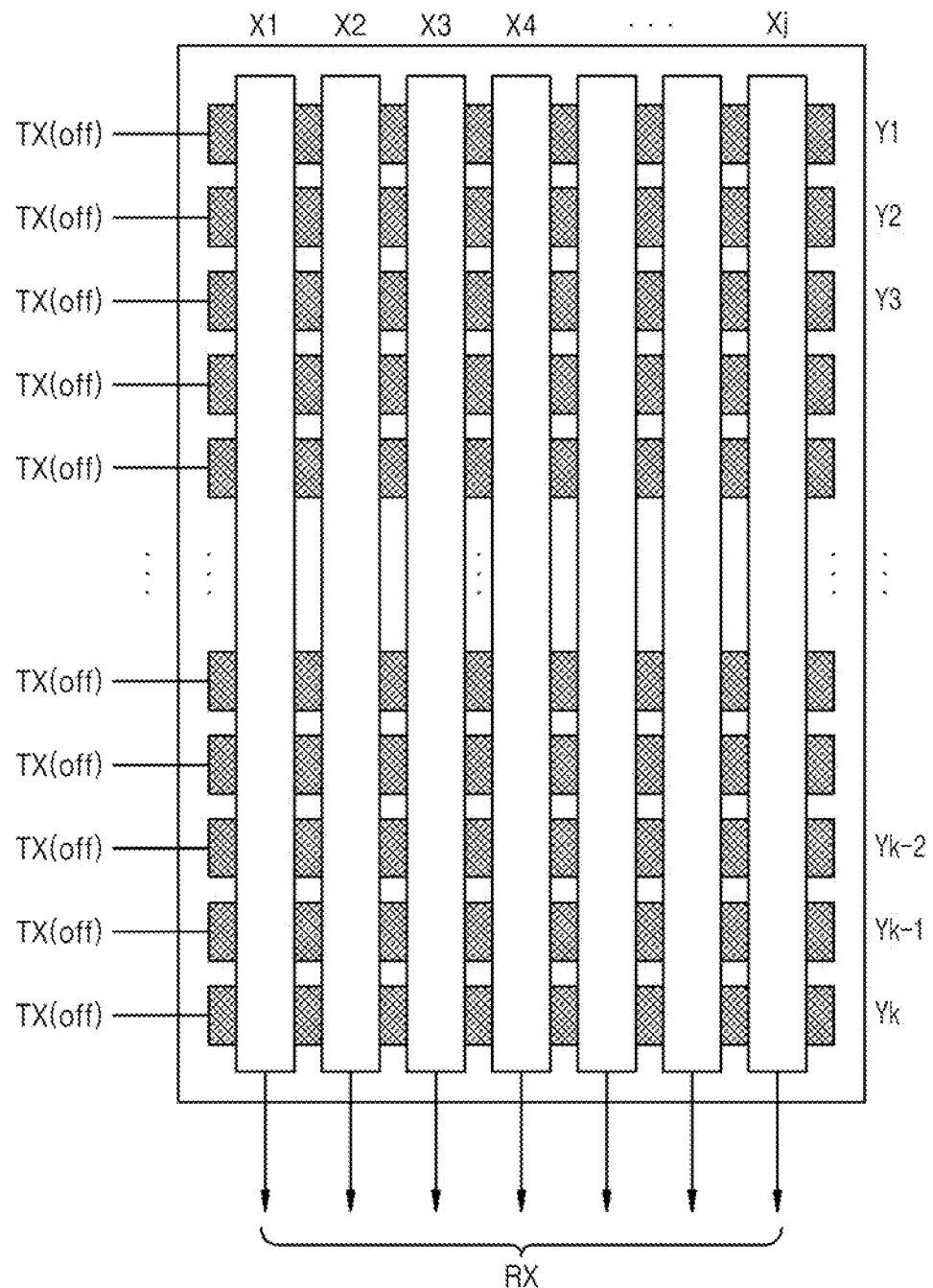
FIG. 4 is a diagram showing a display noise sensing method according to an example embodiment.

FIG. 4 is a diagram showing a display noise sensing method according to an example embodiment. The display noise sensing method of FIG. 4 may be performed by the TSC 210 of FIGS. 1 and 2, and descriptions thereof will be given below with reference to FIGS. 1 and 2 together.

Referring to FIGS. 1, 2, and 4, the TSC 210 may receive sensing signals Ssen from a plurality of receiving electrodes (e.g., first to j-th receiving electrodes Xi to Xj (j is a positive integer)) without providing driving signals to a plurality of driving electrodes (e.g., first to k-th driving electrodes (k is a positive integer)) of the touch sensor 110. The plurality of TXs 11 of the driving circuit 10 may be turned off, and the plurality of RXs 21 of the read-out circuit 20 may operate normally and receive sensing signals Ssen. Because driving signals are not provided to the touch sensor 110, touch signals based on the driving signals are not generated and the sensing signals Ssen may not include touch signals. However, noise may be introduced into the touch sensor 110, and the sensing signals Ssen may include the noise without the touch signal.

The TSC 210 may perform noise sensing by receiving the sensing signals Ssen from the plurality of receiving electrodes without providing the driving signals to the plurality of driving electrodes of the touch sensor 110 during a display period, and noise included in the sensing signals Ssen may be display noise. As described above, the TSC 210 may perform display noise sensing.

The sensing signals Ssen may include display noise, and the read-out circuit 20 may generate display noise data according to the display noise. As the amount of display noise generated increases, a data value of the display noise data may increase.

The noise processing module 31 may process touch data generated according to touch sensing based on display noise data generated according to display noise sensing.

According to the display noise sensing method according to the present example embodiment, because a driving signal is not applied to a plurality of driving electrodes, power consumption for display noise sensing may be reduced.

Figure 5A:
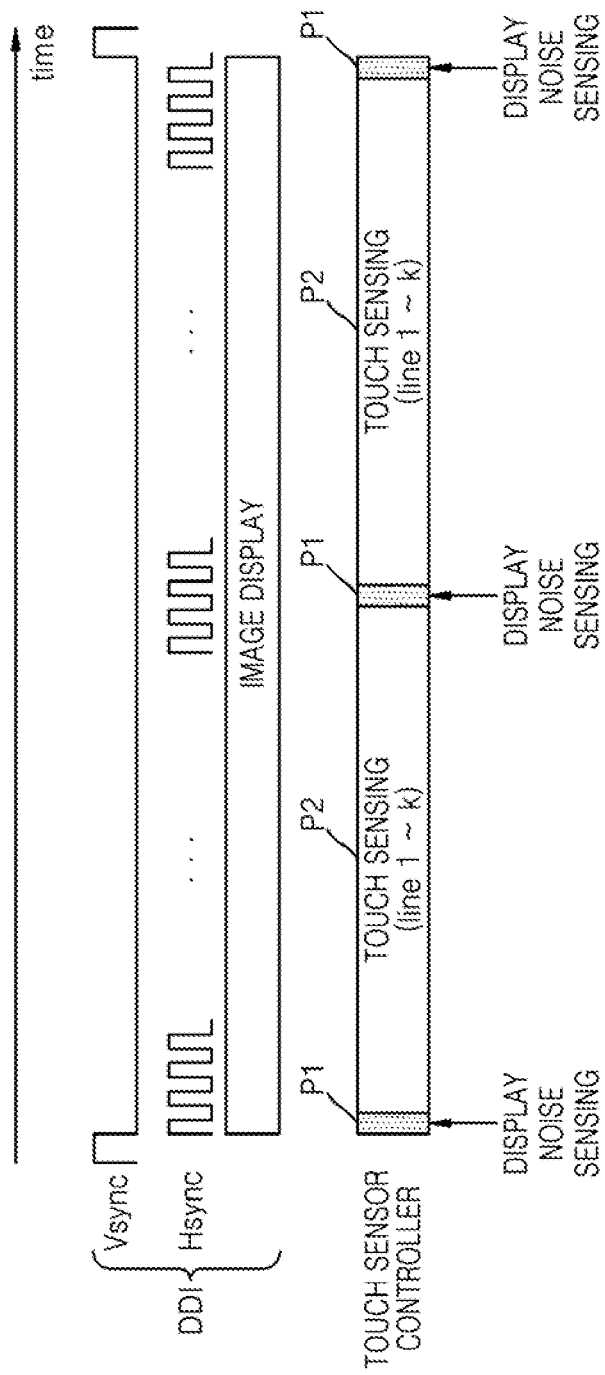
FIGS. 5A and 5B are timing diagrams showing an operating method of a touch sensor controller according to an example embodiment.
Figure 5B:
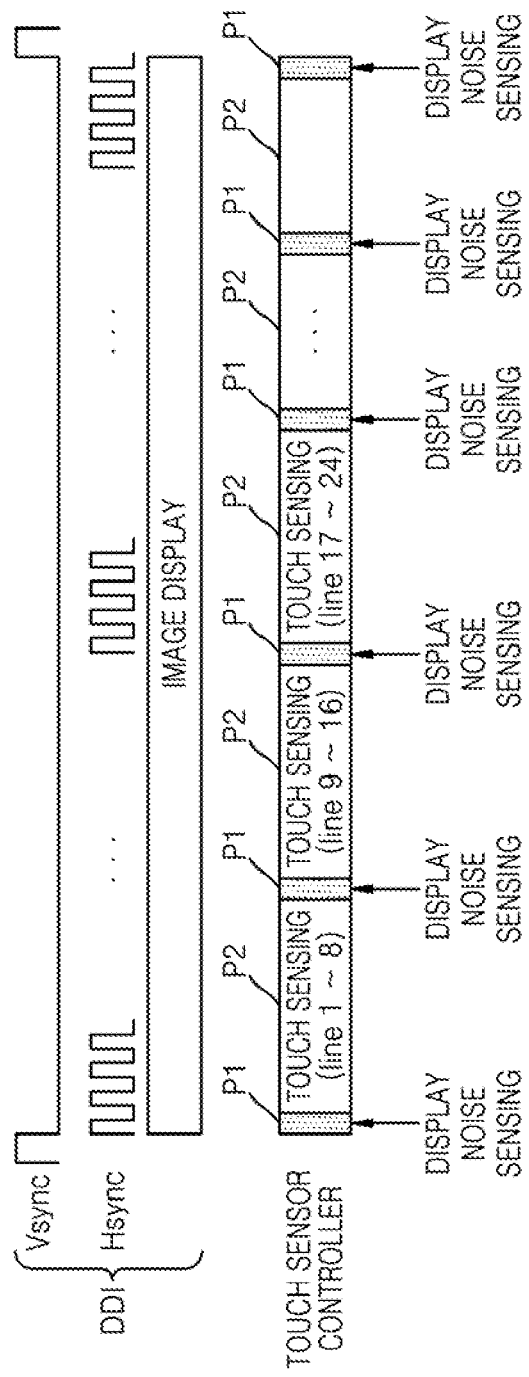

FIGS. 5A and 5B are timing diagrams showing an operating method of a TSC according to an example embodiment. In FIGS. 5A and 5B, the horizontal axis represents time.

Referring to FIGS. 5A and 5B, the TSC (210 of FIG. 2) may perform display noise sensing and touch sensing during a display period in which an image is displayed on the display panel (120 of FIG. 1).

For example, the DDI (220 of FIG. 1) may display an image of one frame on the display panel 120 in response to a vertical synchronization signal Vsync and may provide image signals to a plurality of source lines in response to a horizontal synchronization signal Hsync. Therefore, an image may be displayed on the display panel 120.

The TSC 210 may perform display noise sensing in a first period P1 and touch sensing in a second period P2 different from the first period P1. The first period P1 and the second period P2 may overlap a display period, in which an image is displayed on the display panel 120, on the time axis. Thus, display noise sensing and touch sensing may be performed during the display period.

The TSC 210 may perform display noise sensing according to the display noise sensing method described above with reference to FIG. 4. The TSC 210 may receive a timing signal, e.g., a vertical synchronization signal Vsync and a horizontal synchronization signal Hsync, from the DDI 220 and may perform display noise sensing in response to the horizontal synchronization signal Hsync. For example, the DDI 220 may provide image signals to a plurality of source lines of the display panel 120 in response to a rising edge or a falling edge of the horizontal synchronization signal Hsync, and, during an initial period in which image signals are provided in response to the horizontal synchronization signal Hsync, a large amount of display noise may occur. Therefore, the TSC 210 may improve display noise sensing efficiency by performing display noise sensing at a time point where a large amount of display noise occurs, in response to the horizontal synchronization signal Hsync.

The TSC 210 may sense one frame of the touch sensor 110 in the second period P2, as shown in FIG. 5A, or may divide and sense one frame of the touch sensor 110 in the second period P2, as shown in FIG. 5B.

Referring to FIG. 5A, the TSC 210 may sense one frame of the touch sensor 110, e.g., first to k-th lines, in the second period P2. For example, as shown in FIG. 4, the touch sensor 110 may include first to k-th driving electrodes Y1 to Yk, and the TSC 210 may sense the first to k-th lines in the second period P2 by driving the first to k-th driving electrodes Y1 to Yk by at least one line at a time. In this regard, the TSC 210 may perform display noise sensing in the first period P1 before or after sensing one frame of the touch sensor 110.

Referring to FIG. 5B, the TSC 210 may sense one frame of the touch sensor 110 by a plurality of lines at a time in the second period P2. For example, the TSC 210 may sense first to eighth lines of the touch sensor 110 in the earliest second period P2, and sense ninth to sixteenth lines of the touch sensor 110 in a second period P2 after performing display noise sensing. Also, seventeenth to twenty-fourth lines of the touch sensor 110 may be sensed in a second period P2 after performing display noise sensing again. In this regard, the TSC 210 may perform display noise sensing before, after, and in the middle of performing touch sensing for one frame of the touch sensor 110.

The noise processing module (31 of FIG. 2) may process touch data generated according to touch sensing based on display noise data generated according to display noise sensing. When processing a plurality of touch values included in touch data, the noise processing module 31 may process the touch values based on display noise data generated through display noise sensing performed at a time point closest to a time point at which lines corresponding to the touch values are sensed.

Figure 6:
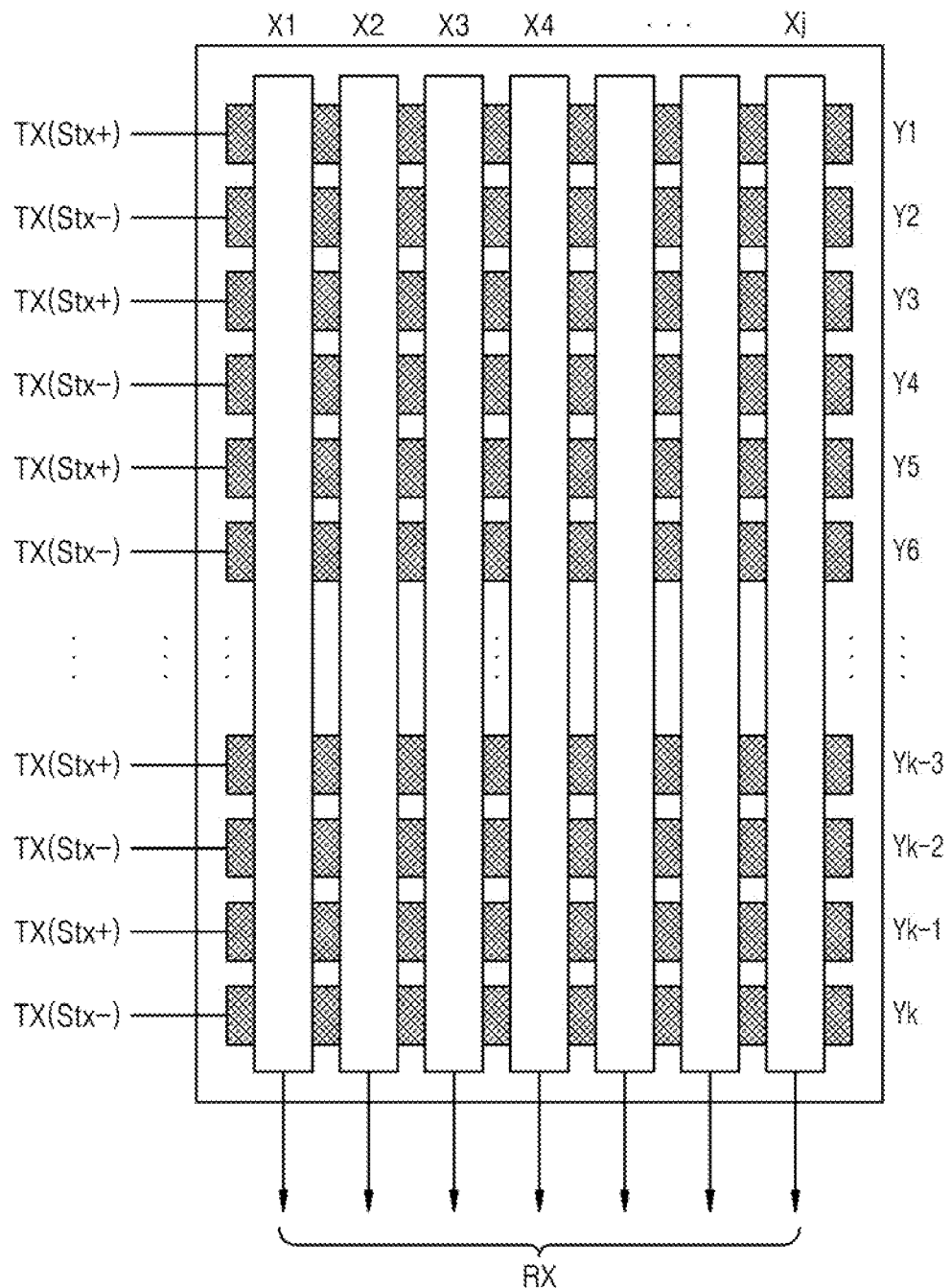
FIG. 6 is a diagram showing a display noise sensing method according to an example embodiment.

FIG. 6 is a diagram showing a display noise sensing method according to an example embodiment. The display noise sensing method of FIG. 6 may be performed by the TSC 210 of FIGS. 1 and 2, and descriptions thereof will be given below with reference to FIGS. 1 and 2 together.

Referring to FIGS. 1, 2 and 6, the TSC 210 may provide a positive driving signal Stx+ or a negative driving signal Stx− to a plurality of driving electrodes of the touch sensor 110, e.g., the first to k-th driving electrodes Y1 to Yk, at the same time. For example, the TSC 210 may apply a positive driving signal Stx+ to at least one driving electrode, and may apply a negative driving signal Stx− to at least one other driving electrode adjacent to the at least one driving electrode.

Figure 7:
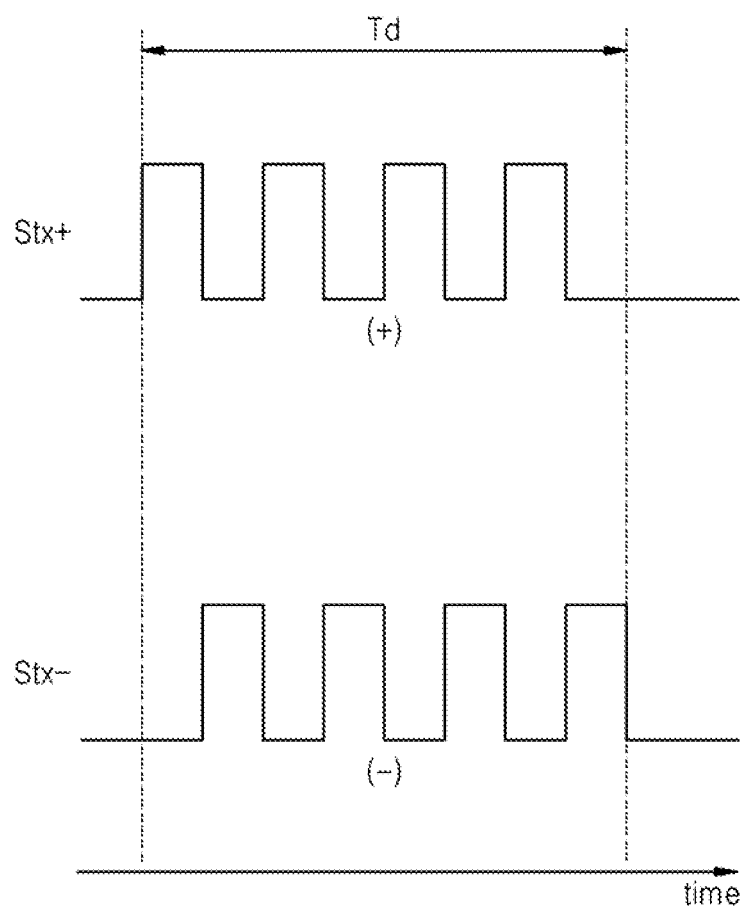
FIG. 7 is a diagram showing a positive driving signal and a negative driving signal of FIG. 6.

FIG. 7 is a diagram showing a positive driving signal and a negative driving signal of FIG. 6.

Referring to FIG. 7, the positive driving signal Stx+ and the negative driving signal Stx− may include a plurality of pulse signals during a driving period Td, and the positive driving signal Stx+ and the negative driving signal Stx− may have the same frequency and opposite phases. However, the positive driving signal Stx+ and the negative driving signal Stx− may be sinusoidal waves having opposite phases and the same frequency.

Referring back to FIG. 6, the positive driving signal Stx+ and the negative driving signal Stx− may be alternately applied to per driving electrode, the positive driving signal Stx+ may be applied to a first driving electrode Y1, and the negative driving signal Stx− may be applied to a second electrode Y2. However, the positive driving signal Stx+ and the negative driving signal Stx− may be alternately applied to at least two driving electrodes. The number of driving electrodes to which the positive driving signal Stx+ is applied may be the same as the number of driving electrodes to which the negative driving signal Stx− is applied.

According to the noise sensing method of FIG. 6, as driving signals of opposite polarities are applied to adjacent driving electrodes, a positive touch signal due to the positive driving signal Stx+ and a negative touch signal due to the negative driving signal Stx− may offset each other. Therefore, sensing signals output through a plurality of receiving electrodes X1 to Xj do not include a touch signal and may include display noise. Display noise is amplified by the positive driving signal Stx+ and the negative driving signal Stx−, and thus, display noise sensing efficiency may be improved. Also, when the frequencies of the positive driving signal Stx+ and the negative driving signal Stx− are changed, display noise may be amplified or attenuated.

Therefore, according to the display noise sensing method, display noise sensing efficiency may be improved.

Figure 8:
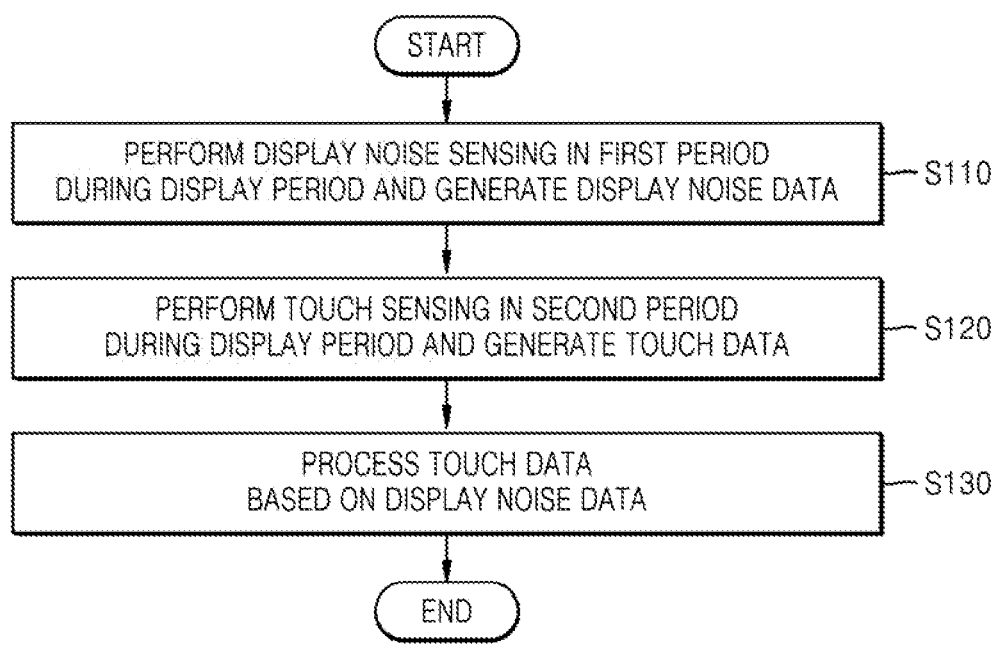
FIG. 8 is a flowchart of an operating method of a touch sensor controller according to an example embodiment.

FIG. 8 is a flowchart of an operating method of the TSC 210 according to an example embodiment. The method of FIG. 8 may be performed by the TSC 210 of FIGS. 1 and 2. Descriptions thereof will be given with reference to FIG. 2 together.

Referring to FIG. 8, the TSC 210 may generate display noise data by performing display noise sensing in a first period of a display period (operation S110). The TSC 210 may sense display noise according to the display noise sensing method described above with reference to FIG. 4 or 6.

As described above, the TSC 210 may not apply a driving signal to a plurality of driving electrodes TE. In another example, the TSC 210 may apply a positive driving signal and a negative driving signal to the driving electrodes TE, e.g., a positive driving signal may be applied to at least one driving electrode TE, and a negative driving signal may be applied to at least one other driving electrode TE adjacent to the at least one driving electrode TE.

The TSC 210 may receive sensing signals from a plurality of receiving electrodes RE, and the sensing signals may include display noise. The TSC 210 may generate display noise data based on display noise.

The TSC 210 may generate touch data by performing touch sensing in a second period of the display period (operation S120). The TSC 210 may sequentially apply driving signals to the driving electrodes TE and receive sensing signals from the receiving electrodes RE every time driving signals are applied to the driving electrodes TE. The sensing signals may include signals, and, when display noise occurs, the touch signals may include the display noise. The TSC 210 may generate touch data based on a sensing signal. The touch data may include a display noise component.

The TSC 210 may process the touch data based on display noise data (operation S130). As described above, the TSC 210 may generate compensated touch data by subtracting display noise from the touch data. When the display data exceeds a predetermined value, the TSC 210 may determine that display noise has occurred and discard the touch data.

Figure 9:
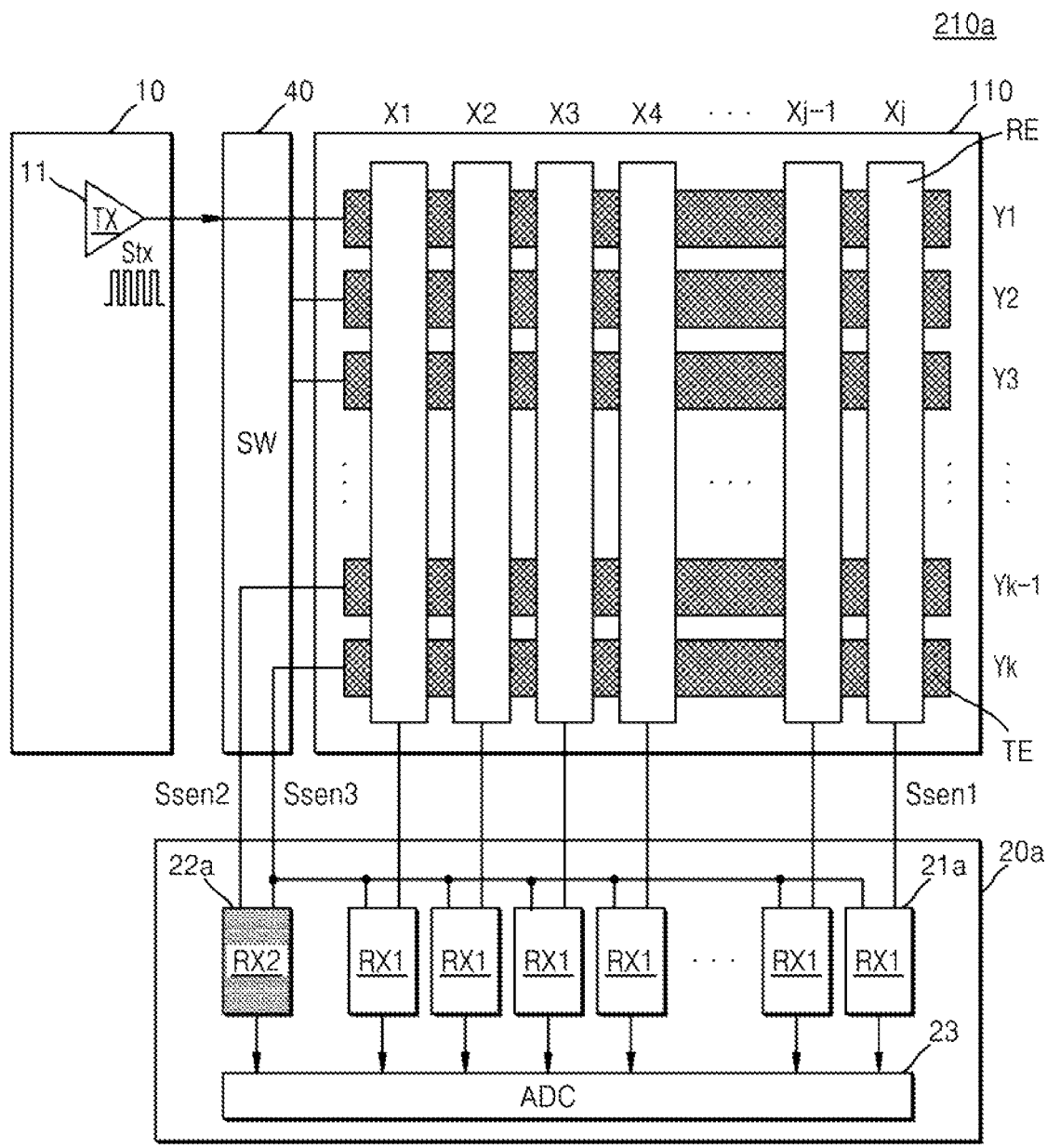
FIG. 9 is a block diagram schematically showing a touch sensor controller according to an example embodiment.

FIG. 9 is a block diagram schematically showing a TSC according to an example embodiment. A TSC 210a of FIG. 9 may be applied as the TSC 210 of FIG. 1. For convenience of explanation, the touch sensor 110 will be shown together.

Referring to FIG. 9, the TSC 210a may include the driving circuit 10, a read-out circuit 20a, and a switching circuit (SW) 40. The TSC 210a may further include the touch processor 30 described with reference to FIG. 2.

Because the driving circuit 10 is the same as the driving circuit 10 described above with reference to FIG. 2, descriptions identical to those given above will be omitted.

The read-out circuit 20a may include a plurality of first receivers (RX1) 21a, at least one second receiver (RX2) 22a, and the ADC 23. The plurality of RX1s 21a may sense a touch signal, and the at least one RX2 22a may sense display noise. Thus, the plurality of RX1s 21a may perform touch sensing, and the at least one RX2 22a may perform display noise sensing. The plurality of RX1s 21a may be referred to as touch sensing circuits, and the at least one RX2 22a may be referred to as a display noise reference sensing circuit.

The plurality of RX1s 21a may receive a plurality of first sensing signals Ssen1 from a plurality of receiving electrodes RE, e.g., first to j-th receiving electrodes X1 to Xj. The first sensing signal Ssen1 may include a touch signal. When display noise occurs, the touch signal may include display noise. The plurality of RX1s 21a may each process and output a received first sensing signal Ssen1. For example, the plurality of RX1s 21a may each current-voltage convert the first sensing signal Ssen1 to generate a sensing voltage, filter a frequency of the sensing voltage, and amplify a gain of a frequency-filtered sensing voltage. In another example, the RX1 21a may current-voltage convert the first sensing signal Ssen1 to generate a sensing voltage and integrate the sensing voltage.

The RX2 22a may receive a second sensing signal Ssen2 from at least one driving electrode TE (hereinafter referred to as a first reference electrode)selected from among driving electrodes TE to which a driving signal Stx is not applied, e.g., a (k-1)-th driving electrode Yk-1. The second sensing signal Ssen2 may include display noise. The R2 22a may process and output the second sensing signal Ssen2.

The ADC 23 may generate touch data and display noise data through analog-to-digital conversion of output signals of the plurality of RX1s 21a and output signals of the RX2s 22a.

The switching circuit 40 may select a first reference electrode to which the second sensing signal Ssen2 is output from among the driving electrodes TE, e.g., the first to k-th driving electrodes Y1 to Yk. The switching circuit 40 may select the first reference electrode from among driving electrodes TE to which a driving signal Stx is not applied. Thus, the switching circuit 40 may electrically connect the first reference electrode selected from among driving electrodes TE, to which a driving signal Stx is not applied, to the RX2 22a.

When performing touch sensing, a driving signal Stx may be sequentially applied to the driving electrodes TE at least one driving electrode TE at a time, and thus, the driving electrodes TE may be sequentially driven. The switching circuit 40 may change the first reference electrode, such that another driving electrode TE to which the driving signal Stx is not applied may be connected to the RX2 22a as the first reference electrode.

For example, when the driving signal Stx is applied to the first driving electrode Y1, the switching circuit 40 may select one of second to k-th driving electrodes Y2 to Yk to which the driving signal Stx is not applied as the first reference electrode. The switching circuit 40 may select a (k-1)-th driving electrode Yk-1 spaced apart from the first driving electrode Y1 as the first reference electrode. For example, when the driving signal Stx is applied to the second driving electrode Y2, the switching circuit 40 may select one of the first driving electrode Y1 and third to k-th driving electrodes Y3 to Yk to which the driving signal Stx is not applied as the first reference electrode and connect the first reference electrode to the RX2 22a.

In an example embodiment, the plurality of RX1s 21a and the at least one RX2 22a may also receive a third sensing signal Ssen3 from at least one driving electrode TE (hereinafter, referred to as a second reference electrode) from among the driving electrodes TE to which the driving signal Stx is not applied, e.g., a k-th driving electrode Yk. The third sensing signal Ssen3 may include display noise. The second reference electrode, by which the third sensing signal Ssen3 is received, is different from the first reference electrode by which the second sensing signal Ssen2 is received.

The plurality of RX1s 21a may generate a touch sensing signal based on the first sensing signal Ssen1 and the third sensing signal Ssen3, and the at least one RX2 22a may generate a display noise reference signal based on the second sensing signal Ssen2 and the third sensing signal Ssen3. The ADC 23 may generate touch data and display noise data through analog-to-digital conversion of the touch sensing signal and the display noise reference signal.

The switching circuit 40 may select a second reference electrode to which the third sensing signal Ssen3 is output from among the driving electrodes Y1 to Yk. The switching circuit 40 may select the second reference electrode from among driving electrodes to which the driving signal Stx is not applied.

When performing touch sensing, as the driving electrodes TE are sequentially driven, the switching circuit 40 may change the second reference electrode, such that the third sensing signal Ssen3 is output from the driving electrode TE to which the driving signal Stx is not applied.

For example, when the driving signal Stx is applied to the first driving electrode Y1, the (k-1)-th driving electrode Yk-1 may be selected as the first reference electrode and the second sensing signal Ssen2 may be received from the (k-1)-th driving electrode Yk-1, and the k-th driving electrode Yk may be selected as the second reference electrode and the third sensing signal Ssen3 may be received from the k-th driving electrode Yk. However, the k-th driving electrode Yk may be selected as the first reference electrode, and the (k-1)-th driving electrode Yk-1 may be selected as the second reference electrode.

Although FIG. 9 shows that two adjacent driving electrodes TE (e.g., the (k-1)-th driving electrode Yk-1 and the k-th driving electrode Yk) are selected as the first reference electrode and the second reference electrode, respectively, another driving electrode TE may be disposed between the first reference electrode and the second reference electrode, and at least one of the first reference electrode and the second reference electrode may include two or more adjacent driving electrodes TE.

Figure 10:
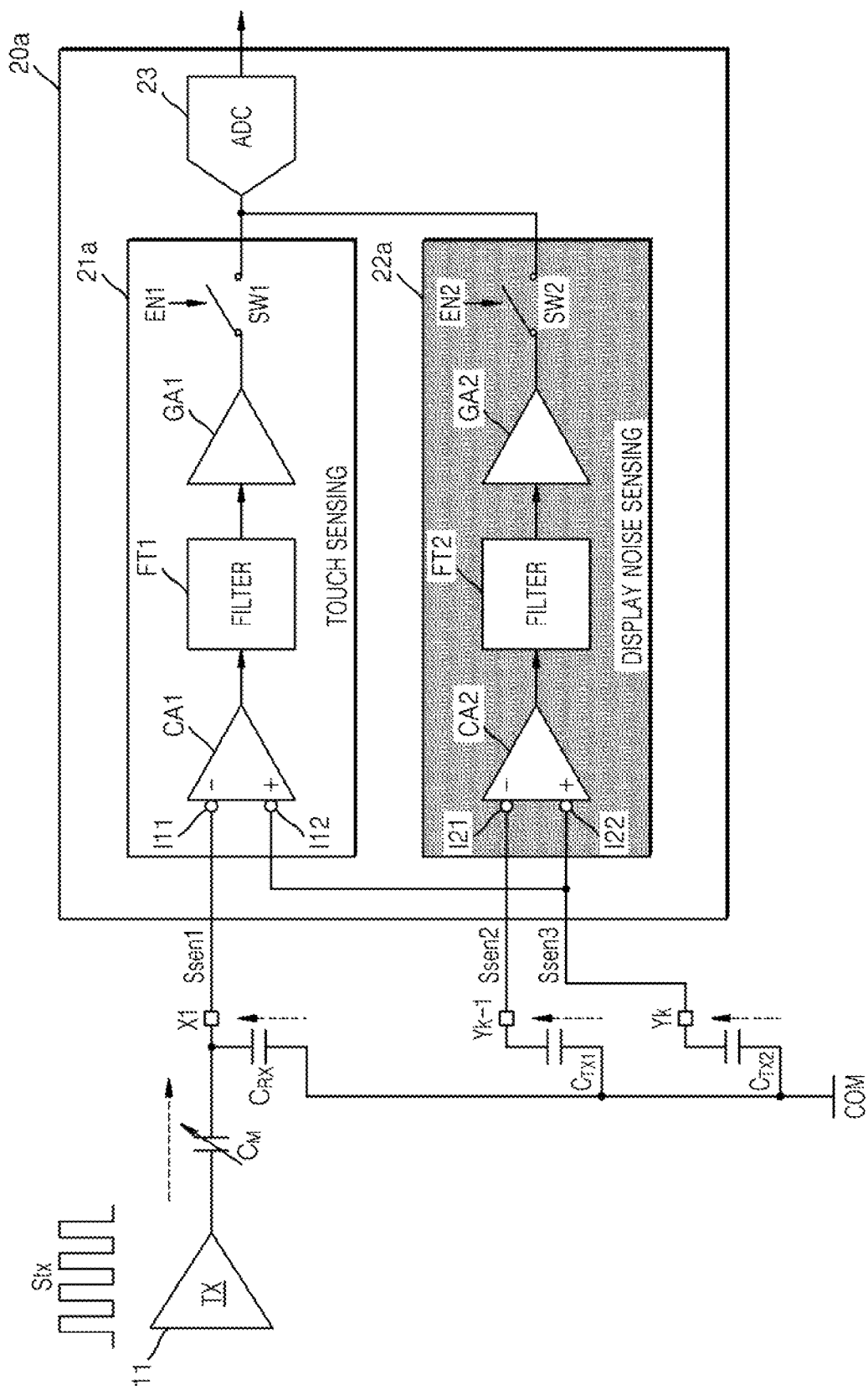
FIG. 10 is a diagram schematically showing operations of a read-out circuit and a read-out circuit according to an example embodiment.

FIG. 10 is a diagram schematically showing operations of a read-out circuit and a read-out circuit according to an example embodiment.

Referring to FIG. 10, the read-out circuit 20a may include the plurality of RX1s 21a, the RX2 22a, and the ADC 23. As described with reference to FIG. 9, the read-out circuit 20a may include the plurality of RX1s 21a. Because the operation of the plurality of RX1s 21a is the same, for convenience of explanation, one RX1 21a connected to a first receiving electrode X1 is shown in FIG. 10.

As described above with reference to FIG. 3, parasitic capacitances $C_{TX1}$ and $C_{TX2}$ may be formed between the common electrode COM and the driving electrodes, e.g., the (k-1)-th driving electrode Yk-1 and the k-th driving electrode Yk, of the display panel 120, and a parasitic capacitance $C_{RX}$ may be formed between the common electrode COM and a receiving electrode, e.g., the first receiving electrode X1.

A touch signal generated by the driving signal Stx provided from the TX 11 may be provided to the RX1 21a connected to the first receiving electrode X1 as the first sensing signal Ssen1. When display noise occurs in the common electrode COM, display noise may be introduced into the first receiving electrode X1 through a noise path formed by the parasitic capacitance $C_{RX}$ and may be included in the first sensing signal Ssen1. Therefore, the first sensing signal Ssen1 may include a touch signal and display noise.

The second sensing signal Ssen2 output from the first reference electrode, e.g., the (k-1)-th driving electrode Yk-1, may be provided to the RX2 22a. Display noise may be introduced into the (k-1)-th driving electrode Yk-1 through a noise path formed by the parasitic capacitance $C_{TX1}$, and display noise may be provided to the RX2 22a as the second sensing signal Ssen2.

The third sensing signal Ssen3 output from the second reference electrode, e.g., the k-th driving electrode Yk, may be provided to the RX1 21a and the RX2 22a. Display noise may be introduced into the k-th driving electrode Yk through a noise path formed by the parasitic capacitance $C_{TX2}$, and display noise may be provided to the RX1 21a and the RX2 22a as the third sensing signal Ssen3.

The RX1 21a may include a first current amplifier CA1, a first filter FT1, and a first gain amplifier GA1. The RX1 21a may further include a first switch SW1.

The first current amplifier CA1 may include a first input terminal I11 and a second input terminal I12. The first sensing signal Ssen1 may be received through the first input terminal I11 and the third sensing signal Ssen3 may be received through the second input terminal I12. The first current amplifier CA1 may amplify an amount of a current corresponding to a difference between the first sensing signal Ssen1 and the third sensing signal Ssen3 and convert the amplified amount of the current into a first sensing voltage.

The first filter FT1 may filter the frequency of the first sensing voltage output from the first current amplifier CA1. For example, the first filter FT1 may be implemented as a low-pass filter that passes a frequency band lower than or equal to a first frequency, and thus, the first filter FT1 may pass a frequency component lower than or equal to the first frequency from among the frequency components of the first sensing voltage and block frequency components higher than the first frequency. For example, the first filter FT1 may remove high frequency noise from the first sensing voltage. The first filter FT1 may output a first sensing voltage from which high frequency noise is removed.

The first gain amplifier GA1 may amplify a first sensing voltage output from the first filter FT1. For example, the first gain amplifier GA1 may have a first gain and may amplify the magnitude of the first sensing voltage by the first gain. The first gain amplifier GA1 may output an amplified first sensing voltage as a touch sensing signal.

The first switch SW1 may be turned on or turned off in response to a first enable signal EN1. The first enable signal EN1 may be received from the touch processor (30 of FIG. 2). When the first switch SW1 is turned on, a touch sensing signal may be provided to the ADC 23.

The RX2 22a may include a second current amplifier CA2, a second filter FT2, and a second gain amplifier GA2. The RX2 22a may further include a second switch SW2.

The second current amplifier CA2 may include a first input terminal I21 and a second input terminal I22. The second sensing signal Ssen2 may be received through the first input terminal I21 and the third sensing signal Ssen3 may be received through the second input terminal I22. The second current amplifier CA2 may amplify an amount of a current corresponding to a difference between the second sensing signal Ssen2 and the third sensing signal Ssen3 and convert the amplified amount of the current into a second sensing voltage.

The second filter FT2 may filter the frequency of the second sensing voltage output from the second current amplifier CA2. For example, the second filter FT2 may be implemented as a low-pass filter that passes a frequency band lower than or equal to a second frequency, and thus, the second filter FT2 may pass a frequency component lower than or equal to the second frequency from among the frequency components of the second sensing voltage and block frequency components higher than the second frequency. For example, the second filter FT2 may remove high frequency noise from the second sensing voltage. The second filter FT2 may output a second sensing voltage from which high frequency noise is removed. The second frequency of the second filter FT2 may be the same as or different from the first frequency of the first filter FT1.

The second gain amplifier GA2 may amplify a second sensing voltage output from the second filter FT2. For example, the second gain amplifier GA2 may have a second gain and may amplify the magnitude of the second sensing voltage by the second gain. The second gain amplifier GA2 may output an amplified second sensing voltage as a display noise reference signal. The second gain of the second gain amplifier GA1 may be the same as or different from the first gain of the first gain amplifier GA1.

The second switch SW2 may be turned on or turned off in response to a second enable signal EN2. A third enable signal EN2 may be received from the touch processor (30 of FIG. 2). When the third switch SW3 is turned on, a display noise reference signal may be provided to the ADC 23.

The ADC 23 may convert a plurality of touch sensing signals sequentially received from the plurality of RX1s 21a into a plurality of touch values. Therefore, touch data including a plurality of touch values corresponding to a plurality of sensing nodes on the touch sensor (110 of FIG. 2) may be generated. The ADC 23 may also convert a display noise reference signal received from the RX2 22a into display noise data.

As described above, the read-out circuit 20a according to an example embodiment may include the RX2 21a for display noise sensing, separate from the RX1 20a for performing touch sensing. When the RX1 20a performs touch sensing, the RX2 21a may simultaneously perform display noise sensing. Therefore, the RX2 21a may detect a change in display noise in real time.

Figure 11:
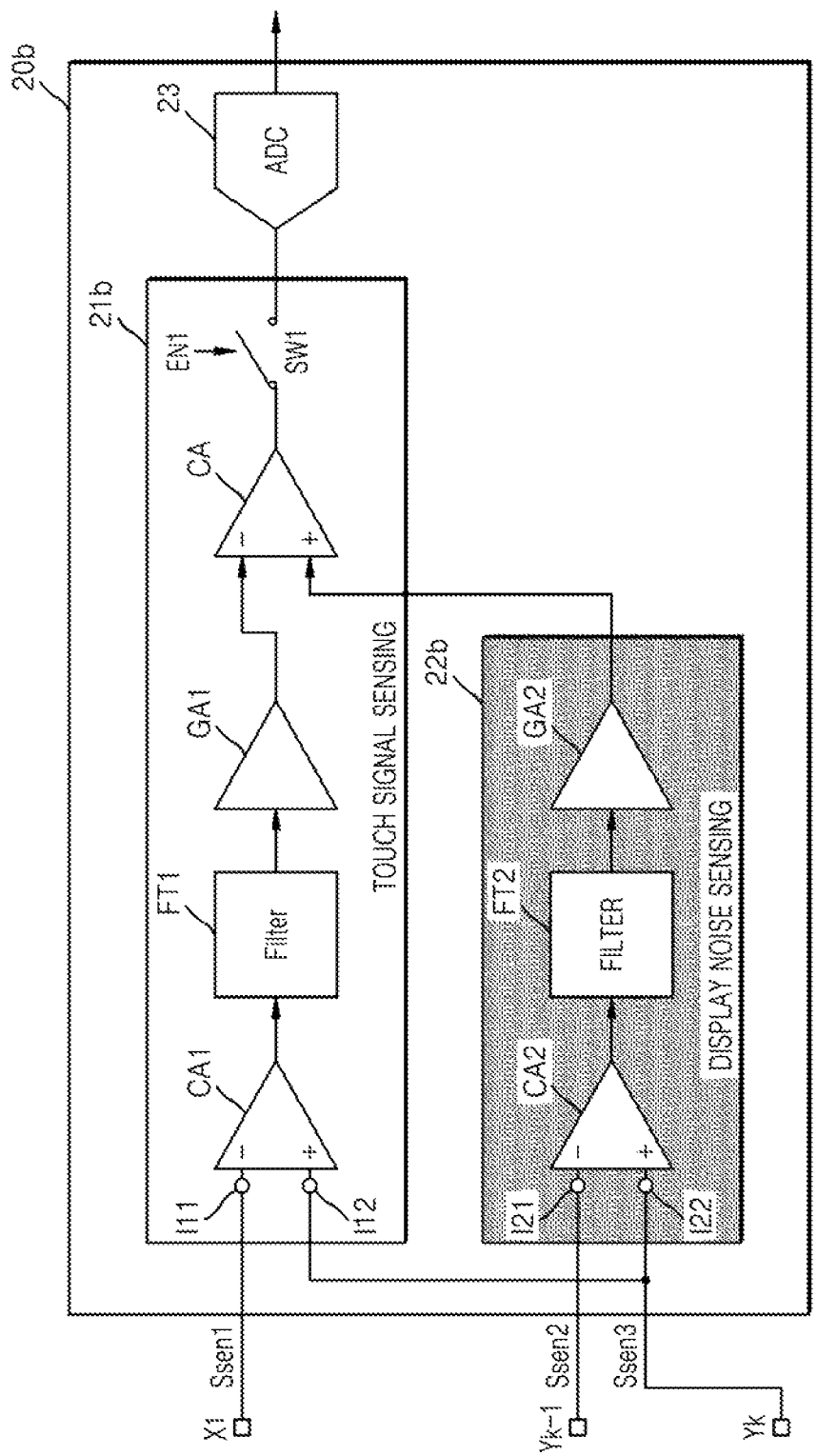
FIG. 11 is a diagram schematically showing operations of a read-out circuit and a read-out circuit according to an example embodiment.

FIG. 11 is a diagram schematically showing operations of a read-out circuit and a read-out circuit according to an example embodiment. A read-out circuit 20b of FIG. 11 may be a modified example of the read-out circuit 20a of FIG. 10. Therefore, the descriptions given above with reference to FIG. 10 may also be applied to the operation of the read-out circuit 20b of FIG. 11.

Referring to FIG. 11, the read-out circuit 20b may include an RX1 21b, an RX2 22b, and the ADC 23.

The RX1 21b may include the first current amplifier CA1, the first filter FT1, the first gain amplifier GA1, a differential amplifier CA, and the first switch SW1. The RX2 22b may include the second current amplifier CA2, the second filter FT2, and the second gain amplifier GA2. As compared with the read-out circuit 20a of FIG. 10, the RX1 21b may further include the differential amplifier CA.

The differential amplifier CA may amplify a difference between a touch sensing signal (output from the first gain amplifier CA1) and a display noise reference signal (output from the second gain amplifier GA2 of the RX2 22b), and output a compensated touch sensing signal. Therefore, display noise may be removed from the touch sensing signal.

The ADC 23 may convert a compensated touch sensing signal output from the differential amplifier CA into a touch value. The ADC 23 may receive a plurality of touch sensing signals sequentially from the plurality of RX1s 21a, and convert the touch sensing signals into a plurality of touch values. Therefore, touch data from which display noise is removed may be generated.

Figure 12:
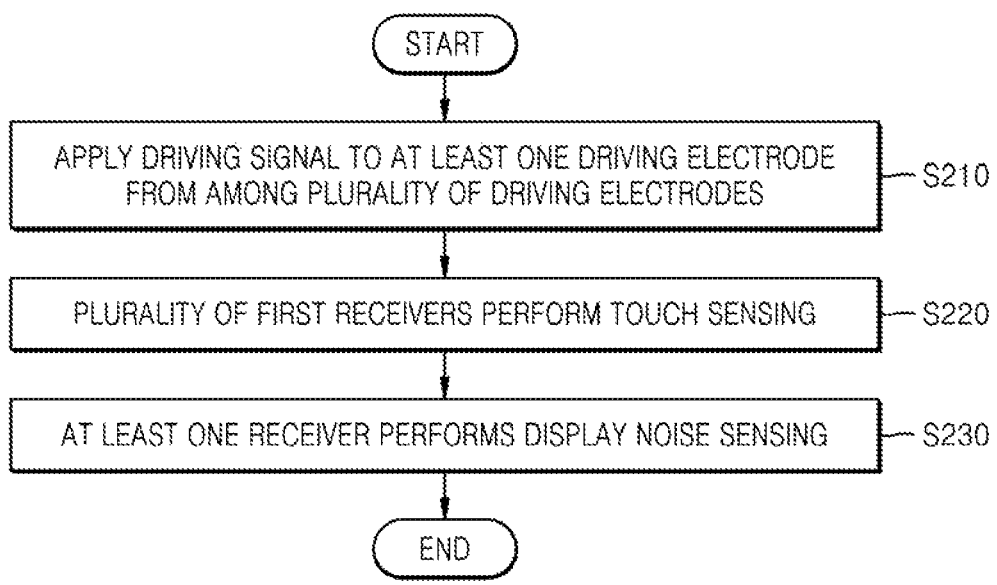
FIG. 12 is a flowchart of an operating method of a touch sensor controller according to an example embodiment.

FIG. 12 is a flowchart of an operating method of the TSC 210 according to an example embodiment. The operating method of the TSC 210 of FIG. 12 may be performed by the TSC 210 of FIGS. 1 and 2, the read-out circuit 20a of FIG. 11, and the read-out circuit 20b of FIG. 12.

Referring to FIG. 12, the TSC 210 may apply a driving signal to at least one driving electrode from among a plurality of driving electrodes (operation S210).

A plurality of RX1s (e.g., 21a of FIG. 11) provided in the TSC 210 may perform touch sensing (operation S220). The plurality of RX1s 21a may perform touch sensing by receiving and processing a first sensing signal from corresponding receiving electrodes from among a plurality of receiving electrodes.

At least one RX2 (e.g., 22a of FIG. 11) provided in the TSC 210 may perform display noise sensing (operation S230). The at least one RX2 22a may perform display noise sensing by receiving and processing a second sensing signal from at least one other driving electrode to which a driving signal is not applied from among the driving electrodes. The touch sensing of operation S220 may be simultaneously performed with the display noise sensing of operation S230, and the operating method of the TSC 210 according to an example embodiment may be performed during a display period in which an image is displayed on the display panel (120 of FIG. 1).

In an example embodiment, the TSC 210 may generate touch data based on a touch sensing signal according to touch sensing, and may generate display noise data based on a display noise reference signal according to display noise sensing. The TSC 210 may process the touch data based on display noise data.

In an example embodiment, the TSC 210 may generate a compensated touch sensing signal by removing a display noise reference signal according to display noise sensing from a touch sensing signal according to touch sensing. The TSC 210 may generate touch data from which display noise is removed based on the compensated touch sensing signal.

Figure 13:
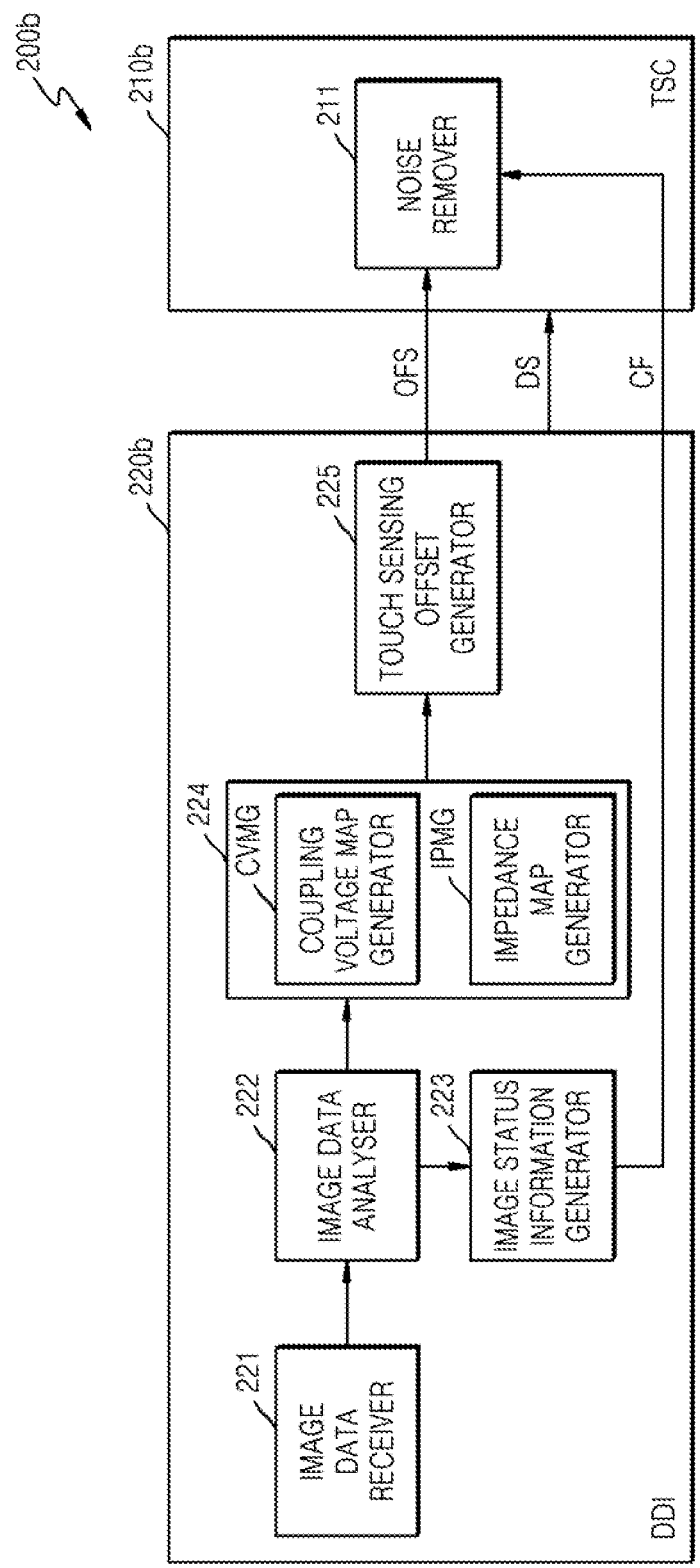
FIG. 13 is a block diagram schematically showing a touch screen driving circuit according to an example embodiment.
Figure 14:
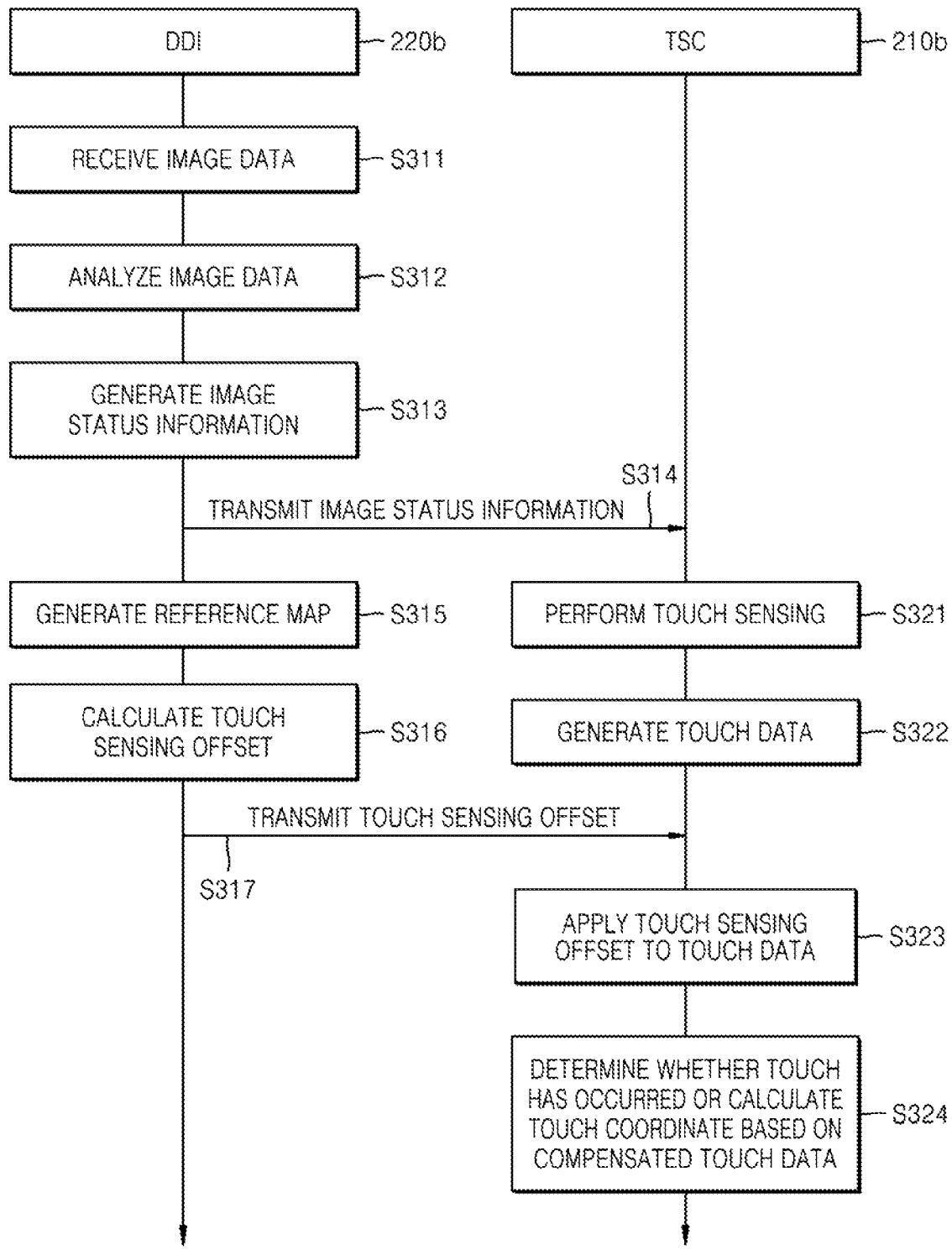
FIG. 14 is a flowchart showing operations of a touch sensor controller and a display driving circuit provided in the touch screen driving circuit of FIG. 13.

FIG. 13 is a block diagram schematically showing a touch screen driving circuit 200b according to an example embodiment, and FIG. 14 is a flowchart showing operations of a TSC 210b and a DDI 220b provided in the touch screen driving circuit 200b of FIG. 13. The touch screen driving circuit 200b may be applied to the touch screen driving circuit 200 of FIG. 1.

Referring to FIG. 13, the touch screen driving circuit 200b may include the TSC 210b and the DDI 220b. As described with reference to FIG. 1, the TSC 210b may provide a driving signal to the touch sensor (110 of FIG. 1), receive a sensing signal according to the driving signal from a touch sensor 110b to perform touch sensing, and detect the occurrence of a touch input (or proximity) and/or calculate a touch coordinate. The DDI 220b may convert image data received from the host (300 of FIG. 1) into an image signal and drive the display panel (120 of FIG. 1) based on the image signal, thereby displaying an image corresponding to the image data on the display panel 120.

The DDI 220b may include an image data receiver 221, an image data analyzer 222, an image status information generator 223, a reference map generator 224, and a touch sensing offset generator 225, and the TSC 210 may include a noise remover 211.

Referring to FIGS. 13 and 14 together, the image data receiver 221 may receive image data from the host (300 of FIG. 1) (operation S321). The image data receiver 221 may receive image data line by line.

The image data analyzer 222 may analyze received image data (operation S312). For example, the image data analyzer 222 may calculate a data difference between lines of image data, that is, a data difference between a previous line and a current line.

The image status information generator 223 may generate image status information indicating a status of image data (operation S313). For example, when there is a change in data equal to or greater than a threshold level between lines of image data, the image status information generator 223 may generate a condition flag CF indicating that a change in image data has occurred, as image status information. The DDI 220b may provide image status information, e.g., the condition flag CF, to the TSC 210b.

The reference map generator 224 may generate a voltage map indicating an amount of voltage change that causes display noise or an impedance map indicating an impedance change, based on image data (operation S315). The reference map generator 224 may include a coupling voltage map generator CVMG and/or an impedance map generator IPMG. The coupling voltage map generator CVMG may generate a coupling voltage map including coupling voltages at a plurality of points of the display panel 120. The impedance map generator IPMG may generate an impedance map representing impedances at a plurality of points of the display panel 120. The impedance map generator IPMG may generate an impedance map based on amounts of power voltage drops at a plurality of points of the display panel 120 according to image data, e.g., amounts of IR-drops of a power voltage (or IR-drop map). A method of generating a coupling voltage map will be described later with reference to FIG. 14, and a method of generating an impedance map will be described later with reference to FIGS. 15 to 17.

The touch sensing offset generator 225 may calculate a touch sensing offset OFS based on at least one of a voltage map generated by the reference map generator 224, e.g., a coupling voltage map and an impedance map. The touch sensing offset OFS may include an offset value indicating a change amount of a touch value according to occurrence of display noise. The touch sensing offset generator 225 may calculate offset values according to a resolution of the touch sensor 110, that is, offset values corresponding to respective sensing nodes of the touch sensor 110. The DDI 220b may provide a touch sensing offset OFS to the TSC 210b (operation S317).

The TSC 210b may perform touch sensing (operation S321) and generate touch data according to the touch sensing (operation S322). When image status information received from the DDI 220b indicates an image change, the TSC 210b may determine that display noise may occur.

The TSC 210b may compensate for touch data by applying a touch sensing offset OFS to the touch data (operation S323). For example, the noise remover 211 may compensate for touch data by subtracting offset values from the touch data. As a result, display noise may be removed from touch data.

The TSC 210b may determine whether a touch has occurred (or whether a conductive object is in the proximity) or calculate a touch coordinate based on the compensated touch data (operation S324).

As described above, in the touch screen driving circuit 200b according to an example embodiment, the DDI 220b generates a voltage map by calculating amounts of voltage changes at a plurality of points on the display panel 120 that cause display noise based on image data, calculates a touch sensing offset OFS based on the voltage map, and provides the touch sensing offset OFS to the TSC 210b. The TSC 210b may compensate for touch data based on the touch sensing offset OFS, thereby removing display noise from the touch data.

Components included in the DDI 220b and TSC 210b, e.g., the image data receiver 221, the image data analyzer 222, the image status information generator 223, the reference map generator 224, the touch sensing offset generator 225, and the noise remover 211, may be implemented as hardware components, software components, or combinations of hardware and software. For example, components included in the DDI 220 and the TSC 210 may be implemented as hardware logic circuits. In another implementation, components included in the DDI 220 and the TSC 210 may be implemented as programs each including a plurality of instructions, may be stored in a memory provided in the DDI 220b and/or the TSC 210b, and may be executed by a processor provided in the DDI 220b and/or the TSC 210b.

The TSC 210b and the DDI 220b may be integrated on one semiconductor chip or may be separately implemented on a plurality of semiconductor chips. A semiconductor chip in which the TSC 210b and the DDI 220b are integrated may be referred to as a TDDI. In a TDDI, the TSC 210b and the DDI 220b may each include a communication port for transmitting and receiving data or signals to and from each other, and the DDI 220b may transmit image status information, e.g., a condition flag CF and a touch sensing offset OF S, to the TSC 210b through a communication port to which a set interface scheme is applied. Also, the DDI 220b may transmit display status information DS to the TSC 210b through the communication port. For example, in a standby period in which no image is displayed on the display panel 120, the DDI 220b may provide a standby signal to the TSC 210b as the display state information DS.

Figure 15:
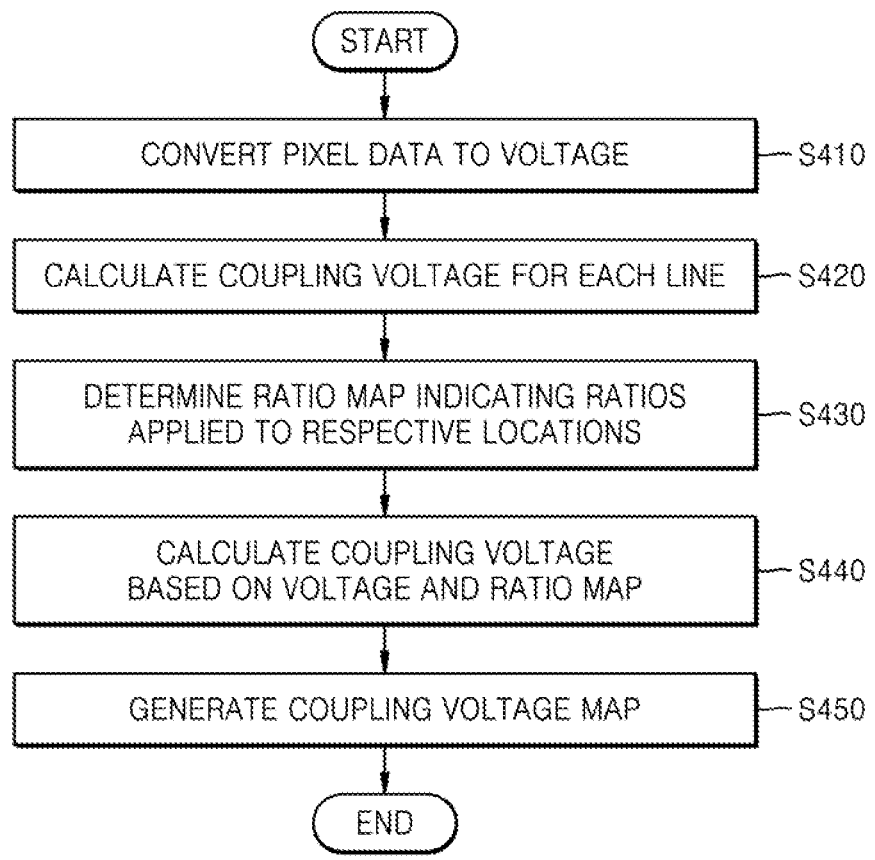
FIG. 15 is a flowchart of a method of generating a coupling voltage map according to an example embodiment.

FIG. 15 is a flowchart of a method of generating a coupling voltage map according to an example embodiment. The method of FIG. 15 may be performed by the coupling voltage map generator CVMG of FIG. 13.

Referring to FIG. 15, the coupling voltage map generator CVMG may convert pixel data into a voltage (operation S410). The coupling voltage map generator CVMG may include mapping information representing voltage values corresponding to pixel data or may receive mapping information from an external source, e.g., the host 300. The coupling voltage map generator CVMG may convert pixel data into a voltage (e.g., a digital signal representing a voltage) based on the mapping information. Pieces of pixel data included in image data may be converted into a plurality of voltages.

The coupling voltage map generator CVMG may calculate a coupling voltage for each line based on converted voltages (operation S420). The coupling voltage map generator CVMG may calculate a coupling voltage by comparing voltages corresponding to pixel data of a previous line with voltages corresponding to pixel data of a current line.

The coupling voltage map generator CVMG may determine a ratio map indicating application ratios of a coupling voltage according to locations (operation S430).

The coupling voltage map generator CVMG may calculate a coupling voltage based on voltages calculated in operation S420 and the ratio map determined in operation S430 (operation S440).

A coupling voltage $\Delta V_n$ may be generated according to Equation 1:

$$\Delta V_n = \left( \alpha \times \left[ \frac{\Sigma(V_n - V_{n-1})}{(\#Hpx)} \right] \right) \times \gamma + (\beta \times \Delta V_{n-1}) \quad \text{[Equation 1]}$$

In Equation 1, the values of α, β, and γ may be determined based on optically and visually measured values during calculation of the coupling voltage.

In Equation 1, α denotes an application ratio of the coupling voltage at the current line, e.g., the n-th line. The value of a may be determined by a degree to which a voltage range of a coupling voltage ΔVn causing coupling is changed. The value of a may be increased or decreased based on whether a voltage is increasing or decreasing.

In Equation 1, the value of γ may be varied depending on the location of the current line on the display panel 120.

In Equation 1, β denotes an effect of the previous line, e.g., the application ratio of the coupling voltage according to a location of the current line on the display panel 120. The value of β may be set according to a degree of stabilization of a ripple due to the coupling voltage of the previous line.

In Equation 1, $V_n$ denotes a voltage of pixels of a current line, e.g., an n-th line.

In Equation 1, $V_{n-1}$ denotes a voltage of pixels of a previous line, e.g., a coupling voltage at the previous line or (n-1)-th line.

In Equation 1, $\Sigma (V_n - V_{n-1})$ denotes the sum of voltage differences between the current line and the previous line corresponding to pixels included in one line.

In Equation 1, #Hpx denotes the number of pixels included in one line.

Therefore, in Equation 1, $$\frac{\Sigma(V_n - V_{n-1})}{(\#Hpx)}$$

represents a coupling voltage at the current line as an average of voltage differences at the current line.

The coupling voltage map generator CVMG may generate a coupling voltage map including coupling voltages calculated for a plurality of locations on a display panel (operation S450).

Figure 16:
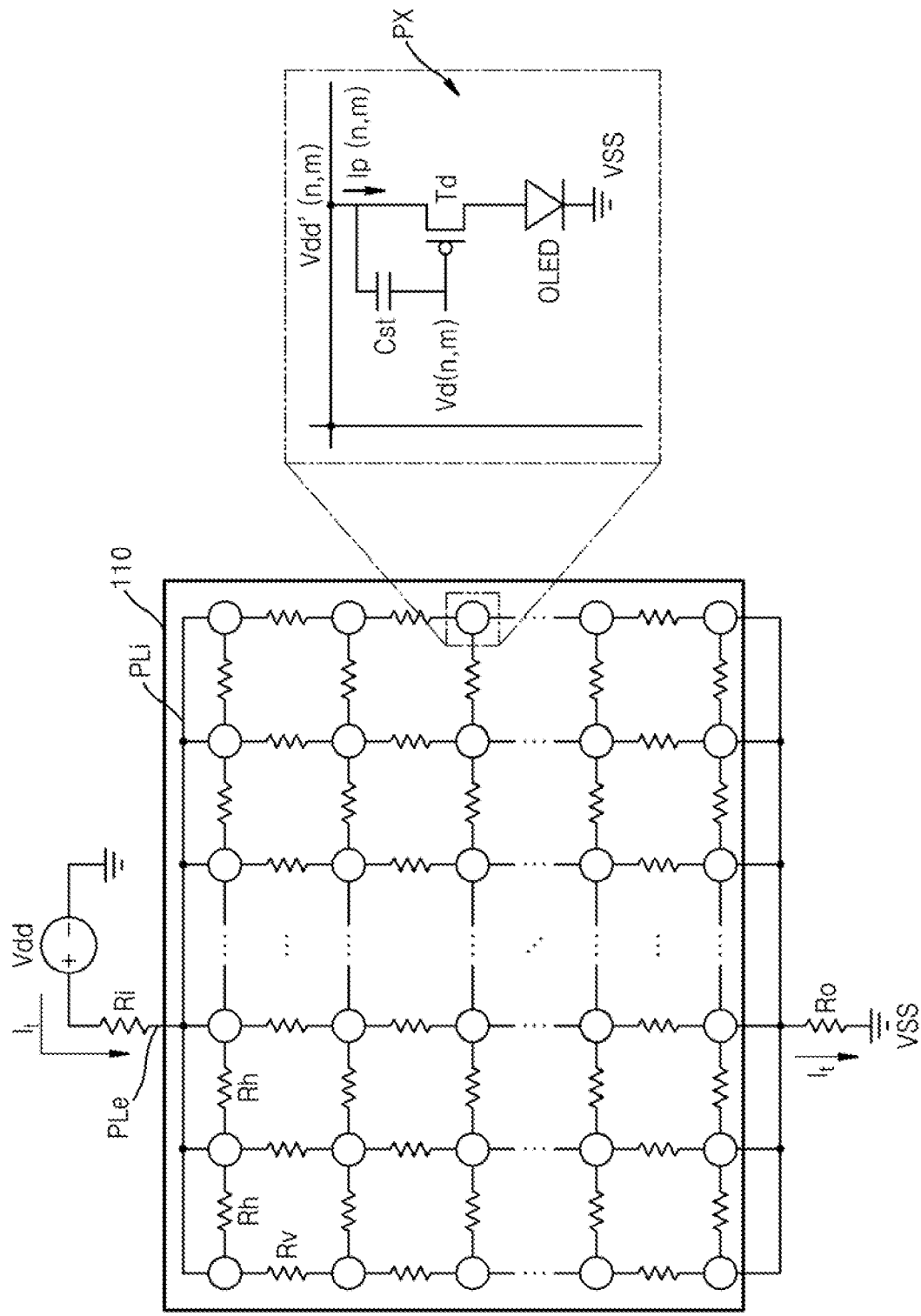
FIG. 16 is a diagram showing a structure of a power line of a display panel.

FIG. 16 is a diagram showing a structure of a power line of the display panel 120.

Referring to FIG. 16, a power line through which a power voltage Vdd is transmitted from the display panel 120 may include an external power line PLe and an internal power line PLi. The external power line PLe may include an external circuit that provides the power voltage Vdd, e.g., a unidirectional wire that transmits the power voltage Vdd from a DDI (DDI 220b of FIG. 13) or a voltage generator. The internal power line PLi may include wires in the form of a meshed grid formed inside the display panel 120.

The external power line PLe may be modeled as parasitic resistances Ri and Ro, and the internal power line PLi may be modeled as a plurality of parasitic resistances Rv and Rh. Pixels PX may be arranged at lattice points of the internal power line PLi, and a pixel PX may include a light emitting device like an organic light emitting diode (OLED), a driving transistor Td, and a storage capacitor Cst. An image signal, e.g., a data voltage Vd(n,m), may be applied to the pixel PX, and the data voltage Vd(n,m) may be stored in the storage capacitor Cst. A pixel current Ip(n,m) according to the data voltage Vd(n,m) may be provided to the OLED through the driving transistor Td. Here, n and m are positive integers, n denotes a line, e.g., a row, on the display panel 120 where the pixel PX is located, and m denotes a column where the pixel PX is located.

A voltage drop of the power voltage Vdd caused by a parasitic resistance present in a power line and a pixel current Ip, which varies depending on an input image, e.g., a data voltage Vd, may be referred to as an IR-drop or a loading effect.

The IR-drop phenomenon may be divided into a global IR-drop phenomenon and a local IR-drop phenomenon. An IR-drop occurring in the external power line PLe due to the parasitic resistances Ri and Ro of the external power line PLe and a current It flowing through the external power line PLe may affect all of the pixels PX of the display panel 120, thereby causing a global IR-drop phenomenon. In the internal power line PLi, since an amount of a current flowing therein varies according to locations, the size of an IR-drop may be varied according to the locations. Therefore, the size of an IR-drop affecting the pixel PX varies, and this may be referred to as a local IR-drop phenomenon.

A global IR-drop phenomenon and a local IR-drop phenomenon may occur differently depending on an image signal input to the display panel 120, e.g., the data voltage Vd, and brightness setting. An IR-drop phenomenon affects display noise, thereby affecting touch data.

A global IR-drop Vgid may be expressed by Equation 2:

$$Vgid = It \times (Ri + Ro) \quad \text{[Equation 2]}$$

A local IR-drop will be described below with reference to FIGS. 17 and 18.

Figure 17:
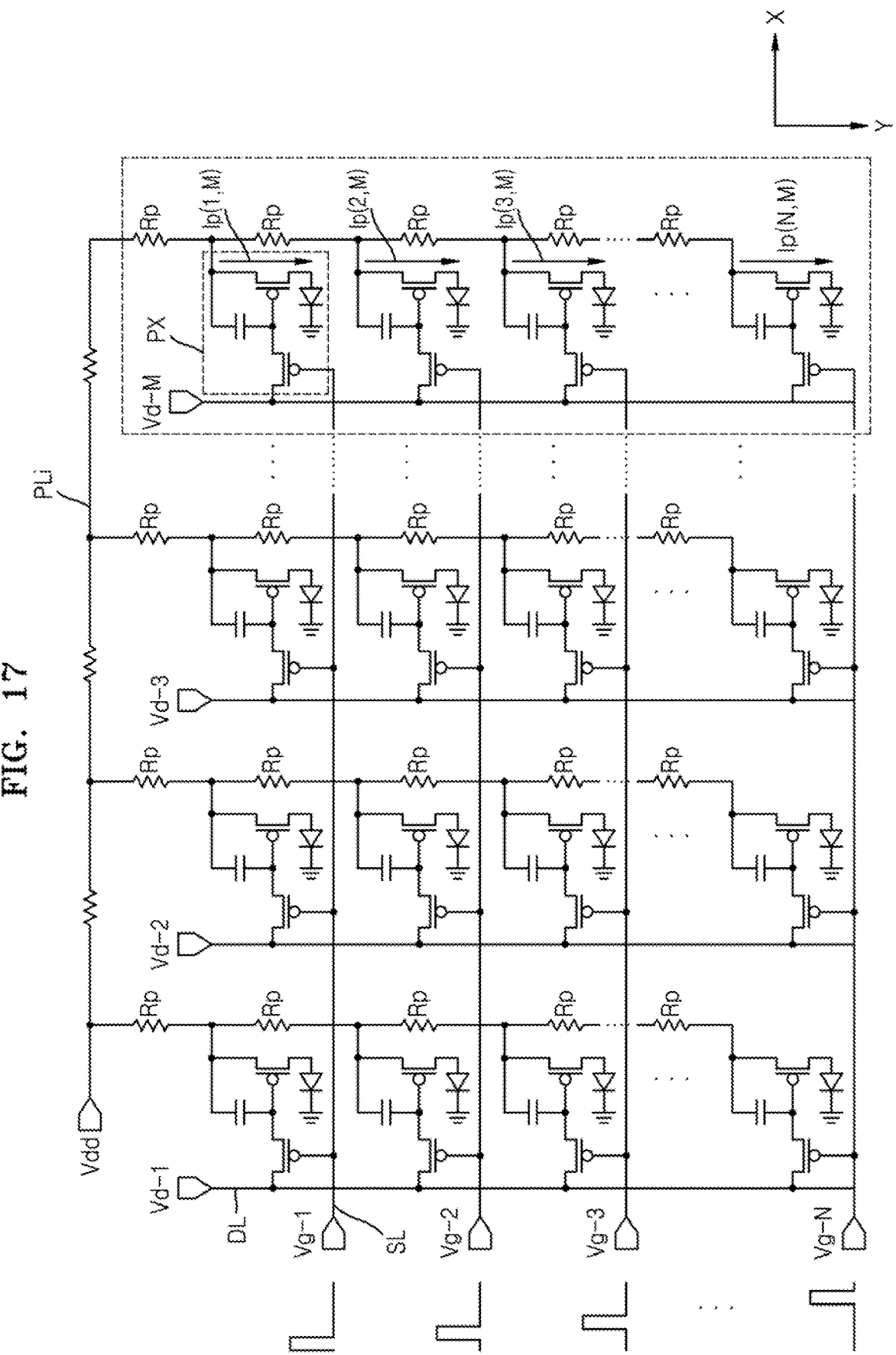
FIG. 17 is a modeling diagram showing an internal structure of a display panel.
Figure 18:
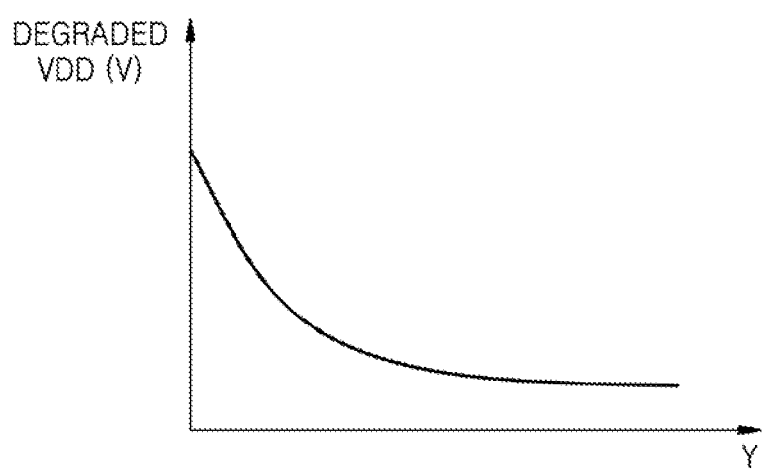
FIG. 18 is a graph showing a power voltage decreased in one column of a display panel.

FIG. 17 is a modeling diagram showing an internal structure of the display panel 120, and FIG. 18 is a graph showing a power voltage decreased in one column of the display panel 120.

Referring to FIG. 17, the display panel 120 may include a plurality of data lines DL and a plurality of scan lines SL, wherein the data lines DL may extend in a second direction, e.g., the Y-axis direction, and the scan lines SL may extend in a first direction, e.g., the X-axis direction. A data line DL and a scan line SL may be referred to as a source line and a gate line, respectively.

A plurality of pixels PX may be arranged in rows and columns. For example, the pixels PX may be arranged in N rows and M columns (N and M are positive integers). The data line DL and the scan line SL may be connected to each of the pixels PX. N scan signals Vg-1 to Vg-N may be sequentially applied to N scan lines SL. M data voltages Vd-1 to Vd-M may be simultaneously applied to M data lines DL. The M data voltages Vd-1 to Vd-M may be applied to M pixels PX connected to the scan line SL to which a scan signal is applied. A pixel current may flow according to applied data voltages. For example, a data voltage Vd-M may be applied to a pixel arranged at an N-th row and an M-th column, and a pixel current Ip(N,M) according to the data voltage Vd-M may flow through a driving transistor. Pixel currents flowing through the respective pixels PX may flow through the internal power line PLi, and thus local IR-drops Vlid at a plurality of points may be different from one another.

A local IR-drop Vlid(n,m) that affects a power voltage applied to the pixel PX arranged at an n-th row and an m-th column can be expressed by Equation 3:

$$Vlid(n,m) = \Sigma_{s=1}^{n}(Rp \times \Sigma_{r=s}^{N} Ip(r,m)) \quad \text{[Equation 3]}$$

In Equation 3, Rp denotes a parasitic resistance at each point of the internal power line PLi, Ip denotes a pixel current, and s and r may be positive integers.

FIG. 18 is a diagram showing the power voltage Vdd lowered by local IR-drops at respective points of one column, e.g., an M-th column. The horizontal axis corresponds to the second direction, e.g., the Y-axis direction, and may represent a distance to a point at which the power voltage Vdd is applied. As the distance from the point at which the power voltage Vdd is applied increases, the size of a local IR-drop may increase. Therefore, as the distance from the point where the power voltage Vdd is applied increases, the power voltage may decrease.

A power voltage Vdd'(n,m) supplied to each pixel PX may be expressed by Equation 4:

$$Vdd'(n,m) = Vdd - (Vgid + Vlid(n,m)) \quad \text{[Equation 4]}$$

An impedance map generator (e.g., IPMG of FIG. 13) may calculate the pixel current Ip flowing through each pixel PX based on a data voltage applied to each pixel PX, and may calculate amounts of IR-drops representing amounts of changes of the power voltage VDD at a plurality of points on the display panel 120 by using Equations 2 to 4 based on pixel currents Ip and parasitic capacitors of the pixels PX, thereby generating an IR-drop map. The impedance map generator IPMG may generate an impedance map representing impedances at a plurality of points of the display panel 120 based on the IR-drop map.

Figure 19:
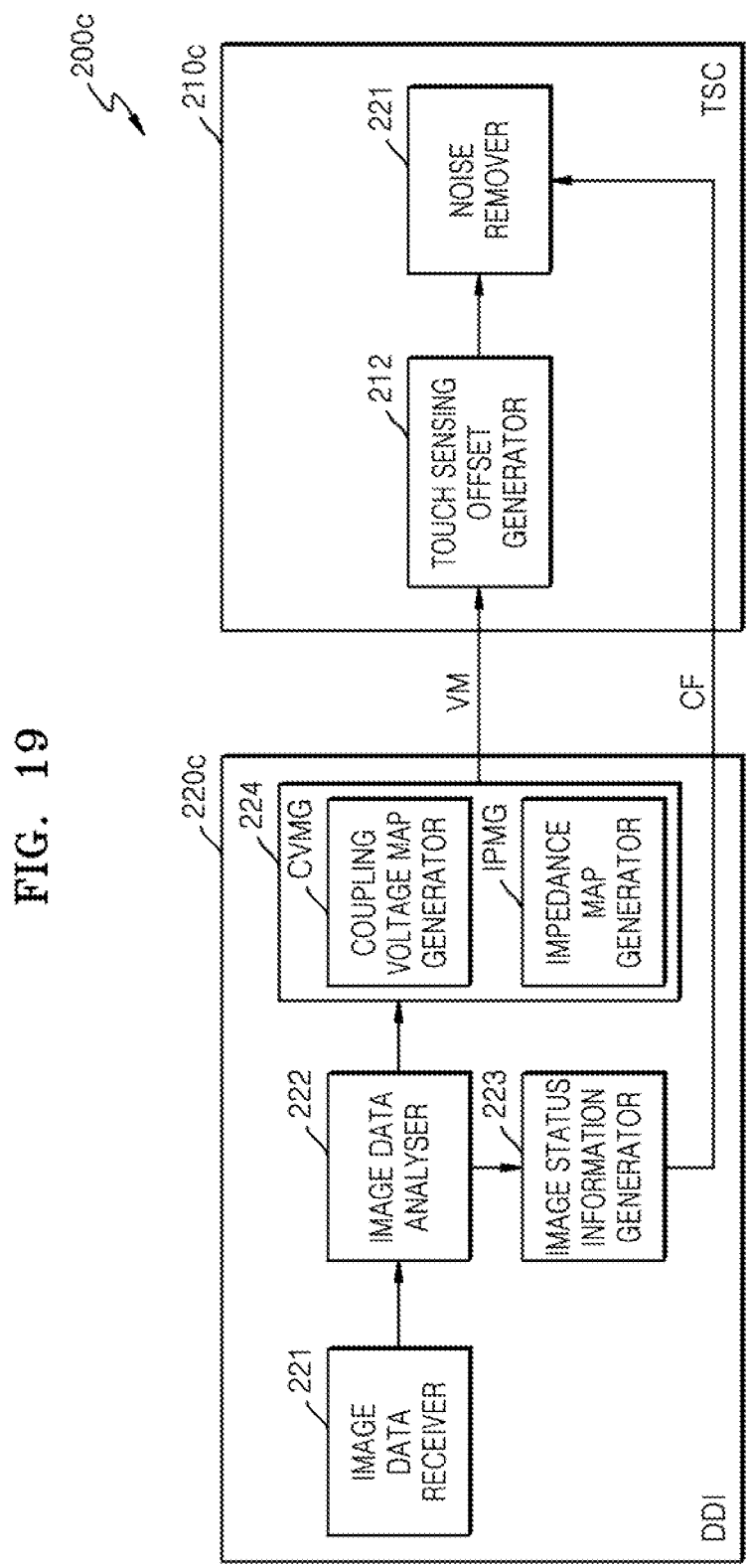
FIG. 19 is a block diagram schematically showing a touch screen driving circuit according to an example embodiment.

FIG. 19 is a block diagram schematically showing a touch screen driving circuit 200c according to an example embodiment.

Referring to FIG. 19, the touch screen driving circuit 200c may include a TSC 210c and a DDI 220c. The TSC 210c and the DDI 220c may be integrated in one semiconductor chip or in different semiconductor chips.

The DDI 220c may include the image data receiver 221, the image data analyzer 222, the image status information generator 223, and the reference map generator 224.

The TSC 210c may include a touch sensing offset generator 212 and the noise remover 211. As compared with FIG. 13, the touch sensing offset generator 212 may be provided in the TSC 210c rather than the DDI 220c.

The DDI 220c may provide a reference map RM including at least one of a coupling voltage map and an impedance map to the TSC 210c. The touch sensing offset generator 212 of the TSC 210c may calculate a touch sensing offset including offset values corresponding to a plurality of sensing nodes of the touch sensor (110 of FIG. 1) based on the reference map RM.

The noise remover 211 may generate compensated touch data by applying a touch sensing offset to touch data generated through touch sensing.

Figure 20:
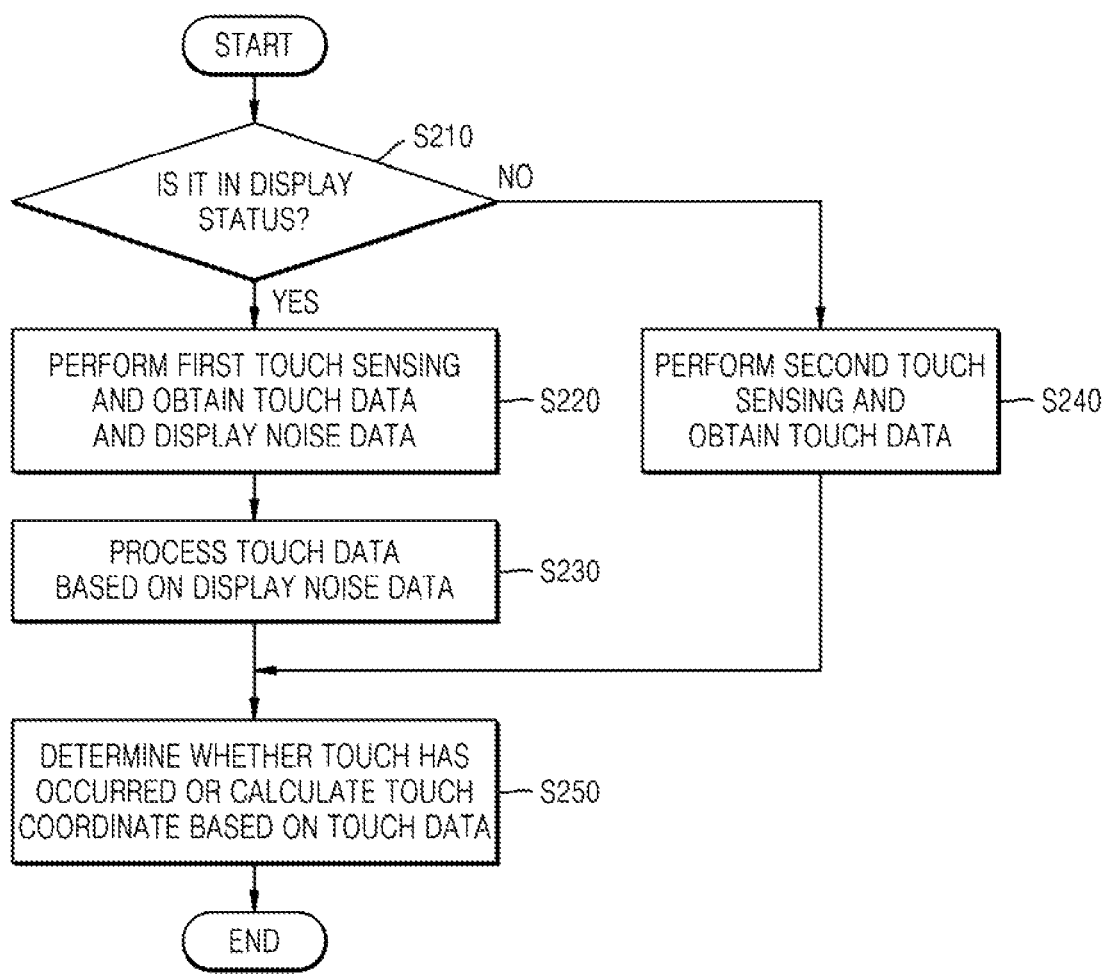
FIG. 20 is a flowchart of an operating method of a touch sensor controller according to an example embodiment.

FIG. 20 is a flowchart of an operating method of the TSC 210 according to an example embodiment.

Referring to FIG. 20, the TSC 210 may determine whether it is in a display state (operation S210). For example, the TSC 210 may receive status information indicating the display status from the DDI (220 of FIG. 1) and determine whether it is in the display state (in which an image is being displayed on the display panel (120 of FIG. 1)) based on the status information.

When it is determined that it is in the display state, the TSC 210 may perform first touch sensing to obtain touch data and display noise data (operation S220). The first touch sensing is a touch sensing operation that considers display noise, and may include performing of the display noise sensing described with reference to FIGS. 4 to 8 and 9 to 12, or application of offset values based on an amount of a voltage change causing display noise as described with reference to FIGS. 13 to 19. For example, the TSC 210 may obtain display noise data through display noise sensing at the same time as or at a different time from touch sensing, or may obtain display noise data based on an amount of a voltage change or a touch sensing offset received from the DDI 220.

The TSC 210 may process the touch data based on display noise data (operation S230).

Meanwhile, when it is determined that it is not in the display state, the TSC 210 may obtain touch data by performing second touch sensing that does not consider display noise (operation S240). When it is not in the display state, it may be considered that no display noise occurs. Therefore, the TSC 210 may not perform the display noise sensing described with reference to FIGS. 4 to 8 and 9 to 12, or may not consider application of offset values based on an amount of a voltage change causing display noise as described with reference to FIGS. 13 to 19.

The TSC 210 may determine whether a touch has occurred or calculate a touch coordinate based on touch data or processed touch data (operation S250). In an example embodiment, the TSC 210 may determine whether a conductive object is in the proximity of the touch sensor 110 based on touch-processed touch data.

Figure 21:
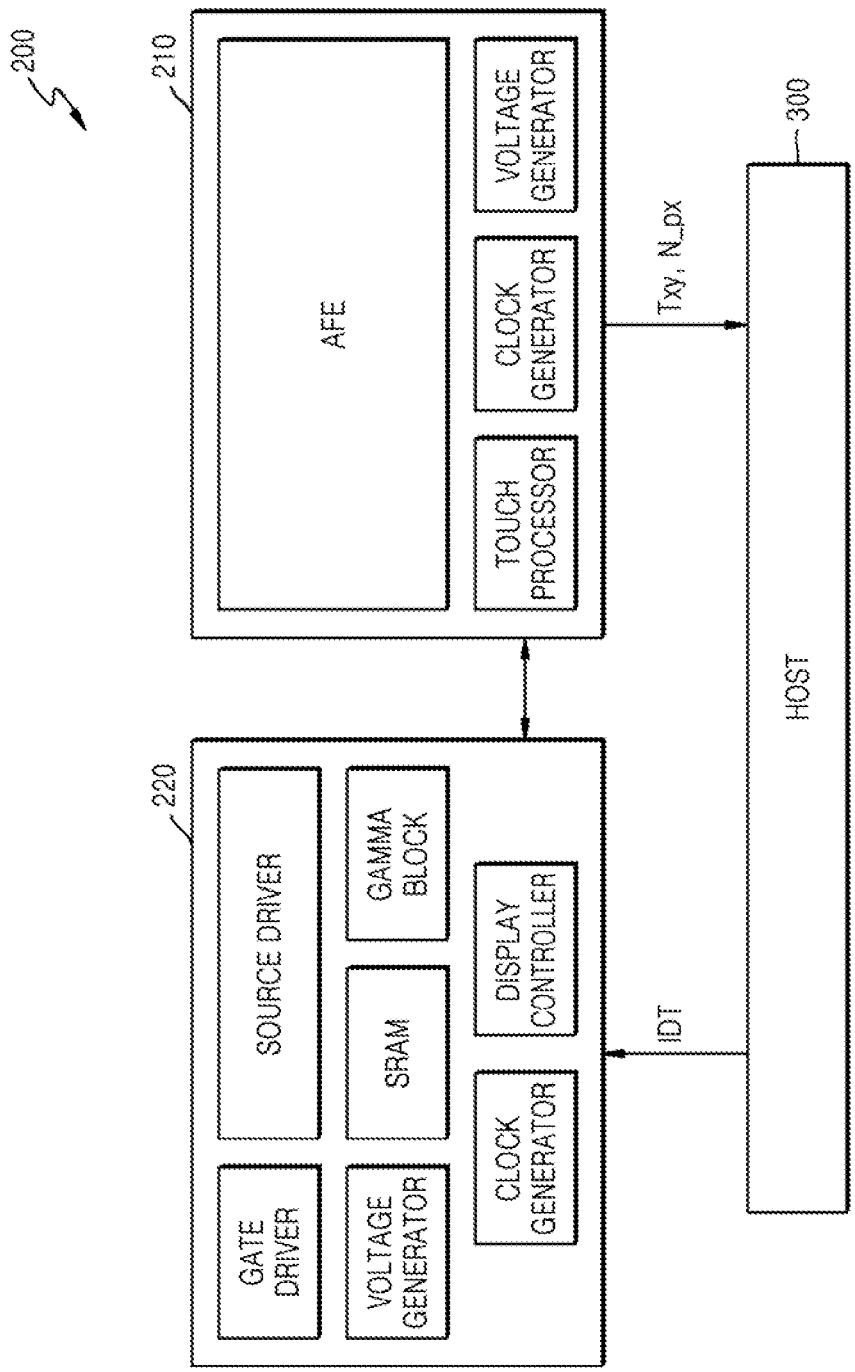
FIGS. 21 and 22 are diagrams showing implementation examples of a touch screen driving circuit according to an example embodiment.
Figure 22:
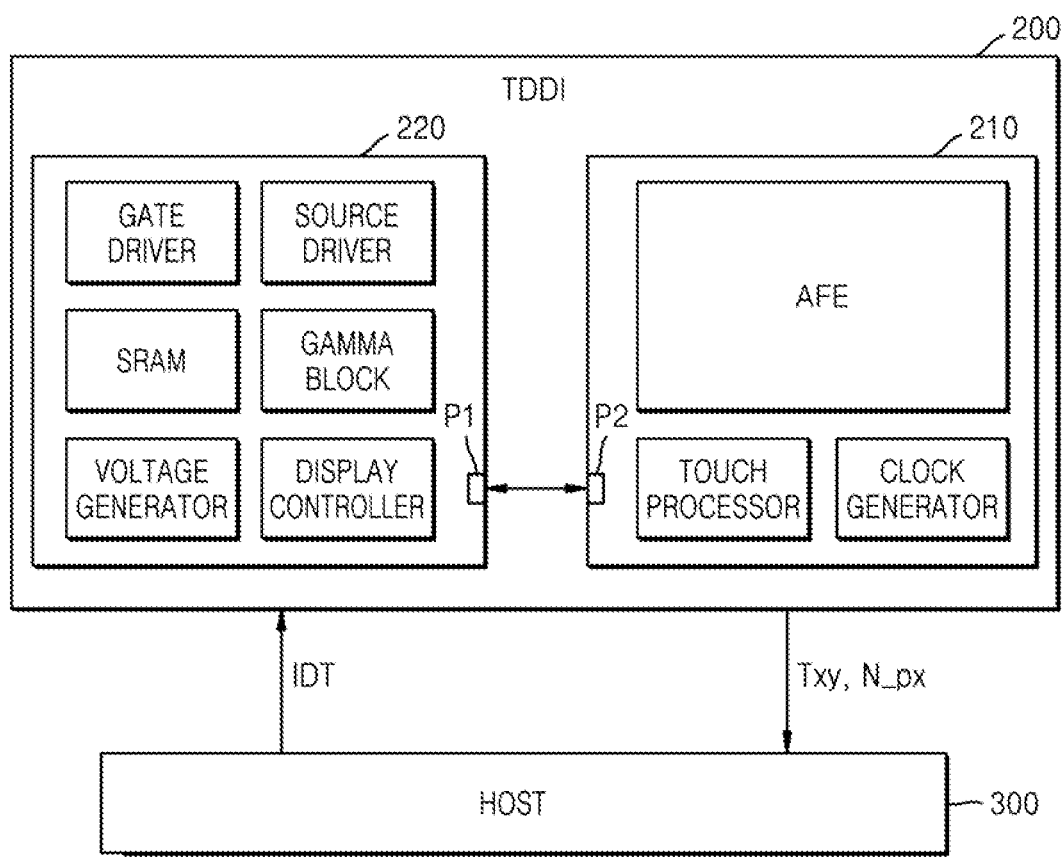

FIGS. 21 and 22 are diagrams showing implementation examples of a touch screen driving circuit according to an example embodiment.

Referring to FIG. 21, the touch screen driving circuit 200 may include the TSC 210 and the DDI 220. In an example embodiment, the TSC 210 and the DDI 220 may be implemented as separate semiconductor chips. In an example embodiment, at least one of the TSC 210 and the DDI 220 may be implemented as a plurality of semiconductor chips.

The TSC 210 and the DDI 220 may operate under the control of the host 300, and the DDI 220 may receive image data IDT from the host 300 and drive the display panel (120 of FIG. 1) to display an image according to the image data IDT on the display panel 120.

The TSC 210 may scan the touch sensor (110 of FIG. 1) and calculate a touch coordinate Txy based on sensing signals received from the touch sensor 110, or detect a touch input (or a conductive object in the proximity). The TSC 210 may provide the touch coordinate Txy or a proximity notification signal N_px to the host 300.

Referring to FIG. 21, the TSC 210 may include an analog-front end (AFE), a touch processor, a clock generator, and a voltage generator.

Also, the TSC 210 may include interface circuits for communication with the host 300 and the DDI 220. As a non-limiting example, an interface circuit for communication with the host 300 may be implemented as one of various interfaces including a universal serial bus (USB) interface, a universal flash storage (UFS) interface, a multimedia controller (MMC) interface, an embedded MMC (eMMC) interface, a peripheral component interconnect express (PCIe) interface, an advanced technology attachment (ATA) interface, a serial advanced technology attachment (SATA) interface, a parallel advanced technology attachment (PATA) interface, a small computer system interface (SCSI), a serial attached SCSI (SAS), an enhanced small disk interface (ESDI), an integrated drive electronics (IDE) interface, and a high-speed serial interface, and an interface circuit for communication with the DDI 220 may be implemented as one from among a universal asynchronous receiver transmitter (UART) interface, an inter integrated circuit (I2C) interface, a serial peripheral interface (SPI), a mobile industry processor interface (MIPI), and an embedded display port (eDP) interface.

The AFE may include the driving circuit (10 of FIG. 2) and the read-out circuit (20 of FIG. 2). The AFE may further include the switching circuit (40 of FIG. 9). The driving circuit (10 of FIG. 2) and the read-out circuit (20 of FIG. 2) may perform the above-described display noise sensing and touch sensing.

The clock generator may generate a clock signal used inside the TSC 210, e.g., a clock signal provided to the driving circuit and the read-out circuit.

The voltage generator may generate voltages used in the AFE.

The touch processor may control the overall operation of the TSC 210, and the touch processor may include the noise processing module 31 of FIG. 2 and/or the noise remover 211 of FIG. 13. The touch processor may further include the touch sensing offset generator 212 of FIG. 19.

Operations of the driving circuit, the read-out circuit, and the touch processor have been described above with reference to FIG. 2, and thus descriptions identical to those will be omitted.

The DDI 220 may include a clock generator, a display controller, a voltage generator, a gamma block, an SRAM, a gate driver, and a source driver. Also, the DDI 220 may include interface circuits for communication with the host 300 and a touch driving circuit TDI.

The clock generator may generate clock signals used inside the DDI 220, e.g., clock signals provided to the source driver and the gate driver.

The voltage generator may generate voltages used in the gate driver and the source driver.

The gamma block may generate a plurality of grayscale voltages corresponding to a plurality of grayscale levels that a pixel value may have and provide the same to the source driver.

The SRAM may store image data IDT received from the host 300. For example, the SRAM may store image data IDT for a plurality of lines or image data IDT for one frame and provide the image data IDT to the source driver line by line.

The gate driver may sequentially provide scan signals to a plurality of scan lines provided in the display panel (120 of FIG. 1).

The source driver may simultaneously provide image signals, e.g., data voltages, to a plurality of data lines provided in the display panel 120.

The display controller may control the overall operation of the DDI 220. In an example embodiment, the display controller may include the image data receiver 221, the image data analyzer 222, the image status information generator 223, the reference map generator 224 of FIG. 13, and the touch sensing offset generator 225.

In an example embodiment, the DDI 220 and the TSC 210 may communicate with each other, and the DDI 220 and the TSC 210 may include interface circuits for communication. As a non-limiting example, an interface circuit for communication between the DDI 220 and the TSC 210 may be implemented as one of various interfaces including a universal serial bus (USB) interface, a universal flash storage (UFS) interface, a multimedia controller (MMC) interface, an embedded MMC (eMNIC) interface, a peripheral component interconnect express (PCIe) interface, an advanced technology attachment (ATA) interface, a serial advanced technology attachment (SATA) interface, a parallel advanced technology attachment (PATA) interface, a small computer system interface (SCSI), a serial attached SCSI (SAS), an enhanced small disk interface (ESDI), an integrated drive electronics (IDE) interface, and a high-speed serial interface, and an interface circuit for communication with the DDI 220 may be implemented as one from among a universal asynchronous receiver transmitter (UART) interface, an inter integrated circuit (I2C) interface, a serial peripheral interface (SPI), a mobile industry processor interface (MIPI), and an embedded display port (eDP) interface.

Referring to FIG. 22, the touch screen driving circuit 200 may include the TSC 210 and the DDI 220. The touch screen driving circuit 200 may be integrated into one semiconductor chip, and touch screen driving circuit 200 may be referred to as a touch DDI (TDDI).

The TSC 210 may include an AFE and the touch processor for driving the touch sensor (110 of FIG. 1). The DDI 220 may include the gate driver, the source driver, the SRAM, the gamma block, and the display controller for driving the display panel (120 of FIG. 1). The TSC 210 or DDI 220 may include a clock signal generator that generates at least one clock signal used in the touch screen driving circuit 200 and a voltage generator that generates a plurality of voltages. Although FIG. 21 shows that the clock generator is provided in the TSC 210 and the voltage generator is provided in the DDI 220, this may be implemented differently. The touch screen driving circuit 200 may further include an interface circuit for communication with the host 300.

The TSC 210 and the DDI 220 may communicate with each other within the touch screen driving circuit 200, and the TSC 210 and the DDI 220 may include ports for communication with each other, e.g., a first port P1 and a second port P2, respectively. Clock signals and voltages may be transmitted/received through data lines connected through the first port P1 and the second port P2, and various types of data, e.g., the touch sensing offset OFS and the image status information (e.g., the condition flag CF, the display status information DS, or the reference map RM) described above with reference to FIGS. 13 and 19, may be transmitted/received.

By way of summation and review, a parasitic capacitance between a display panel and a touch sensor may increase as a distance between the display panel and a touch sensor becomes very small, e.g., as touch screens become ultra thin, and display noise occurring while performing a display may be introduced into the touch sensor by a parasitic capacitor. Such display noise may degrade touch sensing sensitivity. Also, when the touch sensor performs a proximity sensing function, a signal sensed by the touch sensor may be very weak, and thus, it may be difficult to distinguish a change in a sensing signal due to the proximity of a conductive object to the touch sensor from a change in a sensing signal resulting from display noise introduced into the touch sensor.

As described above, example embodiments may provide a touch sensor controller for improving touch sensing sensitivity, an operating method of the touch sensor controller, and a touch screen driving circuit including the touch sensor controller.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operating method of a touch sensor controller for driving a touch sensor stacked on a display panel, the operating method comprising:
   generating, by the touch sensor controller, display noise data by performing display noise sensing on the touch sensor in a first period and a third period, the first period and the third period overlapping a display period in which an image is displayed on the display panel;
   generating, by the touch sensor controller, touch data by performing touch sensing on a first portion of the touch sensor in a second period and a second portion of the touch sensor in a fourth period, the second period and the fourth period overlapping the display period and being different from the first period and the third period, and the first portion of the touch sensor is different from the second portion of the touch sensor; and
   processing, by the touch sensor controller, the touch data based on the display noise data generated through display noise sensing performed at a time point closest to a time point at which touch sensing was performed,
   wherein generating the display noise data includes:
      applying, by the touch sensor controller, a positive driving signal to at least one first driving electrode among a plurality of first driving electrodes of the touch sensor;
      applying, by the touch sensor controller, a negative driving signal to at least one second driving electrode among a plurality of second driving electrodes adjacent to the at least one first driving electrode; and
      receiving, by the touch sensor controller, display noise signals from sensing electrodes of the touch sensor.

2. The operating method as claimed in claim 1, wherein generating the touch data includes:
   sequentially applying, by the touch sensor controller, drive signals to a plurality of drive electrodes of the touch sensor; and
   receiving, by the touch sensor controller, touch sensing signals from sensing electrodes of the touch sensor, the touch sensing signals including a touch signal and display noise.

3. The operating method as claimed in claim 1, wherein the plurality of first driving electrodes to which the positive driving signal is applied and the plurality of second driving electrodes to which the negative driving signal is applied are alternately disposed in the touch sensor.

4. The operating method as claimed in claim 1, wherein a number of the plurality of first driving electrodes and a number of the plurality of second driving electrodes are the same.

5. The operating method as claimed in claim 1, wherein the positive driving signal and the negative driving signal include pulse signals and have opposite phases.

6. The operating method as claimed in claim 1, wherein the processing of the touch data includes generating compensated touch data by subtracting the display noise data from the touch data.

7. A touch screen driving circuit for driving a touch screen panel including a display panel and a touch sensor stacked on the display panel, the touch screen driving circuit comprising:
   a display driving circuit configured to calculate change amounts of a power voltage at locations of the display panel based on received image data, and generate compensation information based on the change amounts of the power voltage at locations of the display panel; and
   a touch sensor controller configured to receive the compensation information from the display driving circuit, and compensate for touch data generated based on touch sensing values received from the touch sensor based on the compensation information.

8. The touch screen driving circuit as claimed in claim 7, wherein the display driving circuit being configured to calculate change amounts of the power voltage includes determining an amount of IR-drops of the power voltage at the locations of the display panel, respectively.

9. The touch screen driving circuit as claimed in claim 8, wherein the display driving circuit includes an impedance map generating circuit configured to calculate a pixel current flowing through each pixel of the display panel and generate a map representing an amount of IR-drops at each of the locations of the display panel based on the pixel current and parasitic resistance of each pixel.

10. The touch screen driving circuit as claimed in claim 7, wherein the change amount of the power voltage includes a coupling voltage for each line of the display panel according to the image data.

11. The touch screen driving circuit as claimed in claim 10, wherein the display driving circuit includes a coupling voltage map generator configured to calculate the coupling voltage by comparing voltages corresponding to pixel data of a previous line of the display panel with voltages corresponding to pixel data of a current line of the display panel and generate a coupling voltage map including coupling voltages at each of the locations of the display panel.

12. The touch screen driving circuit as claimed in claim 9, wherein:
   the display driving circuit includes an offset generating circuit configured to calculate touch sensing offset values corresponding to sensing nodes of the touch sensor based on the change amounts of a power voltage at each of the locations of the display panel, and
   the touch sensor controller compensates for touch data based on the touch sensing offset values.

13. The touch screen driving circuit as claimed in claim 9, wherein the touch sensor controller calculates touch sensing offset values corresponding to sensing nodes of the touch sensor based on the compensation information from the display driving circuit, and compensates for touch data based on the touch sensing offset values.

14. The touch screen driving circuit as claimed in claim 7, wherein:
   the display driving circuit is configured to transmit a first flag indicating that there is a change in an image to the touch sensor controller when a data change between adjacent lines of the received image data is equal to or greater than a predetermined value, and transmit a second flag indicating that there is no change in the image to the touch sensor controller when the data change is less than the predetermined value, and
   the touch sensor controller is configured to compensate for the touch data based on the compensation information when the first flag is received, and not compensate when the second flag is received.

15. A touch sensor controller for driving a touch sensor that is stacked on a display panel including driving electrodes and receiving electrodes crossing the driving electrodes, the touch sensor controller comprising:
   a driving circuit configured to sequentially provide driving signals to the driving electrodes;

a read-out circuit configured to, in response to the driving signals, generate touch data based on first sensing signals received from the receiving electrodes and generate display noise data based on a second sensing signal received from a first driving electrode to which a driving signal of the driving signals is not applied from among the driving electrodes; and a touch processor configured to determine whether a touch input has occurred on the touch sensor based on the touch data and the display noise data;

wherein the read-out circuit includes:

first receivers respectively connected to the receiving electrodes to receive the first sensing signals; and a second receiver connected to the first driving electrode to receive the second sensing signal;

wherein:

the second receiver includes a second current amplifier including a first input terminal and a second input terminal, the second sensing signal is applied from the first driving electrode to the first input terminal of the second current amplifier, and a third sensing signal is received at the second input terminal of the second current amplifier from a second driving electrode to which the driving signal is not applied from among the driving electrodes.

16. The touch sensor controller as claimed in claim 15, wherein the read-out circuit further includes:

an analog-digital converter configured to generate the touch data and the display noise data by an analog-to-digital conversion of outputs of the first receivers and an output of the second receiver, respectively.

17. The touch sensor controller as claimed in claim 15, wherein:

the first receivers each include a first current amplifier including a first input terminal and a second input terminal, a corresponding first sensing signal is received at the first input terminal of the first current amplifier, and the third sensing signal is received at the second input terminal of the first current amplifier from the second driving electrode.

18. The touch sensor controller as claimed in claim 15, wherein the first receivers each further include:

a first filter configured to filter a frequency of an output signal of a first current amplifier based on a first frequency; and a first gain amplifier configured to amplify an output signal of the first filter.

* * * * *